(12) United States Patent　　(10) Patent No.: US 7,877,303 B2
Chatlain et al.　　(45) Date of Patent: Jan. 25, 2011

(54) SYSTEM AND METHODS FOR TRACKING THE RELATIVE INTERESTS OF THE PARTIES TO AN INSURANCE POLICY

(75) Inventors: Dean F. Chatlain, Greensboro, NC (US); Randall S. Macon, Greensboro, NC (US); Mary S. Westbrook, Greensboro, NC (US)

(73) Assignee: Lincoln National Life Insurance Company, Fort Wayne, IN (US)

( * ) Notice: Subject to any disclaimer, the term of this patent is extended or adjusted under 35 U.S.C. 154(b) by 1569 days.

(21) Appl. No.: 10/252,224

(22) Filed: Sep. 23, 2002

(65) Prior Publication Data

US 2004/0059609 A1　　Mar. 25, 2004

(51) Int. Cl.
　　*G06Q 40/00*　　(2006.01)
(52) U.S. Cl. ....................................................... 705/35
(58) Field of Classification Search ..................... 705/4, 705/36 R, 37
See application file for complete search history.

(56) References Cited

U.S. PATENT DOCUMENTS

| | | | |
|---|---|---|---|
| 4,642,768 A | | 2/1987 | Roberts |
| 4,969,094 A | * | 11/1990 | Halley et al. ............... 705/36 R |
| 5,655,085 A | * | 8/1997 | Ryan et al. ....................... 705/4 |
| 5,752,236 A | * | 5/1998 | Sexton et al. .................... 705/4 |
| 5,907,828 A | * | 5/1999 | Meyer et al. ..................... 705/4 |
| 5,956,691 A | * | 9/1999 | Powers ............................ 705/4 |
| 6,473,737 B2 | * | 10/2002 | Burke .............................. 705/4 |
| 6,567,790 B1 | * | 5/2003 | Slane ......................... 705/36 R |
| 6,684,189 B1 | * | 1/2004 | Ryan et al. ....................... 705/4 |
| 2001/0037281 A1 | * | 11/2001 | French et al. .................. 705/37 |
| 2004/0030589 A1 | * | 2/2004 | Leisher et al. .................. 705/4 |

OTHER PUBLICATIONS

BEA WebLogic® Server 7.0 Overview, paper entitled "The Foundation for Enterprise Application Infrastructure," BEA White Paper, BEA Systems, Inc. , 38 pages (undated).
Classic LifeComp® Producer's Guide, Jefferson Pilot Financial, pp. I-XXVIII (Jan. 2001).
Private LifeComp® Conceptual Overview, Jefferson Pilot Financial, pp. I-VIII (Jan. 2001).
Private LifeComp® Producer's Guide Single Life, Jefferson Pilot Financial, pp. I-XXXII (Jun. 2001).

(Continued)

*Primary Examiner*—Richard C Weisberger
(74) *Attorney, Agent, or Firm*—Barnes & Thornburg LLP

(57) ABSTRACT

Systems and processes are provided for projecting, tracking and assessing the performance of and relative interests of the parties to one or more cooperatively-funded insurance policies, such as split-dollar or jointly-owned life insurance policies. Certain embodiments can also optimize the structure and function of existing insurance policies. Input data regarding actual and potential parties to an insurance contract, regulatory considerations, as well as the objectives that the parties intend to achieve, is used to propose, create, track, maintain, and implement an insurance policy or a group insurance plan. The input data is communicated to an enterprise platform via a web server. The enterprise platform includes applications which process the data. Data processing functions performed include proposal and policy generation, policy reevaluation and re-proposal, policy conversion, and report generation. The systems and processes optimize achievement of policy objectives and minimize tax consequences under applicable tax codes.

10 Claims, 36 Drawing Sheets

OTHER PUBLICATIONS

Private LifeComp® Conceptual Overview, Jefferson Pilot Financial, pp. I-VIII (Jan. 2001).

J2EE™ Developer's Guide "Enterprise Beans" http:java.sun.com/j2ee/sdk_1.2.1/techdocs/guides/ejb/html/Overview4.html (Sep. 9, 2002).

Session Beans by Gopalan Suresh Raj http://my.execpc.com/~gopalan/java/ejb/session.html (Sep. 9, 2002).

J2EE™ Developer's Guide "Entity Beans" http://java.sun.com/j2ee/sdk_1.2.1/techdocs/guides/ejb/html/Entity.fm.html (Sep. 9, 2002).

* cited by examiner

```
Date Prepared:                          Page A- 1
MSWESTB, LCPC19S2                       4:33 PM          Group: INTROLN      Proposal Number: CHARLES Proposal Date:                              2       II
Specified Face Amount:      1,250,000.00

Agent:   Affiliate

Insured:  Charles Robertson    Male Non-Tobacco User Age 41
Owner:    Charles Robertson    Tax Rate: 35.00
Employer: ABC Corporation      Tax rate: 15.00   Specified D.B. = $500,000.00
Employee: Charles Robertson Use IRS Table 2001 rates for economic benefit
Calculate additional economic benefit for a maximum employer loan of $0.00, calculated +464%
End joint ownership after age 65 or when the employer's loan returns to zero
Bonus employee for economic benefit cost
Endorsement Pay premium through age 65

Calc.  Prem.   Premium/
Age   Option   Mode    Cash Value
 41     1      M       1,500.00

Effective        Policy            Coverage          Employee/   E/  DB  Prem  Table  Flat
  Date       Seg. Yr. Mo Age        Amount            Employer    R  Opt Cat Rating Rating  Mos.                    Guideline Premiums
   1          1   1  1   41     1,250,000.00      500,000.00 R    I   NTU   0    0.00/Y    0       18,044.60      Level            Single
                                                                                                                  216,426.95

Withdrawal/Loan Schedule
Beginning at age 65       95,807.98    Annual withdrawal through age 85 (calculated maximum leaving $50,000.00 at age 95),
                                       THE TARGET CASH VALUE WAS EXCEEDED TO PROVIDE THE FULL WITHDRAWAL/LOAN AMOUNT FOR THE DURATION REQUESTED
Beginning 8/01/2030                    Switch to loans, interest will accumulate Guaranteed Interest:  4.5% (General Account only)
Assumed Interest:     10% (8.3% Net)

Guideline Level Premium               1,503.71 Monthly       18,044.60 Annually
Guideline Single Premium            216,426.95
Target Premium                          966.67 Monthly       11,600.00 Annually
Minimum First Month Premium             806.94
Initial 7 pay premium                 4,208.07 Monthly       50,496.74 Annually

THIS ILLUSTRATION IS FOR AGENT USE ONLY, NO COMPLIANT SECTION IS PRESENT
```

AFR = 2.78%

FIG. 17

Date Prepared:      ⓒ PROGRAM TESTING      PREMIUM SCHEDULE      Page A- 2

II
Flexible Premium Variable Life

Proposal Number: CHARLES
Proposal Date: August 1,
Initial Face Amount: 1,250,000.00
Monthly Premium: 1,500.00

Employer: ABC Corporation
Owner: Charles Robertson
Insured: Charles Robertson

LIFE INSURANCE PAYMENTS

| Beginning Date | Employee Contribution | Planned Premium | | Total Planned Payments |
|---|---|---|---|---|
| | 0.00 | 1,500.00 | monthly | 18,000.00 |
| 8/01/2003 | 0.00 | 1,500.00 | monthly | 18,000.00 |
| 8/01/2004 | 0.00 | 1,500.00 | monthly | 18,000.00 |
| 8/01/2005 | 0.00 | 1,500.00 | monthly | 18,000.00 |
| 8/01/2006 | 0.00 | 1,500.00 | monthly | 18,000.00 |
| 8/01/2007 | 0.00 | 1,500.00 | monthly | 18,000.00 |
| 8/01/2008 | 0.00 | 1,500.00 | monthly | 18,000.00 |
| 8/01/2009 | 0.00 | 1,500.00 | monthly | 18,000.00 |
| 8/01/2010 | 0.00 | 1,500.00 | monthly | 18,000.00 |
| 8/01/2011 | 0.00 | 1,500.00 | monthly | 18,000.00 |
| 8/01/2012 | 0.00 | 1,500.00 | monthly | 18,000.00 |
| 8/01/2013 | 0.00 | 1,500.00 | monthly | 18,000.00 |
| 8/01/2014 | 0.00 | 1,500.00 | monthly | 18,000.00 |
| 8/01/2015 | 0.00 | 1,500.00 | monthly | 18,000.00 |
| 8/01/2016 | 0.00 | 1,500.00 | monthly | 18,000.00 |
| 8/01/2017 | 0.00 | 1,500.00 | monthly | 18,000.00 |
| 8/01/2018 | 0.00 | 1,500.00 | monthly | 18,000.00 |
| 8/01/2019 | 0.00 | 1,500.00 | monthly | 18,000.00 |
| 8/01/2020 | 0.00 | 1,500.00 | monthly | 18,000.00 |
| 8/01/2021 | 0.00 | 1,500.00 | monthly | 18,000.00 |
| 8/01/2022 | 0.00 | 1,500.00 | monthly | 18,000.00 |
| 8/01/2023 | 0.00 | 1,500.00 | monthly | 18,000.00 |
| 8/01/2024 | 0.00 | 1,500.00 | monthly | 18,000.00 |
| 8/01/2025 | 0.00 | 1,500.00 | monthly | 18,000.00 |
| 8/01/2026 | 0.00 | 1,500.00 | monthly | 18,000.00 |

No further scheduled premium payments

FIG. 18

Date Prepared:  PROGRAM TESTING   \*\*\*\* EMPLOYER'S BENEFIT ANALYSIS \*\*\*\*   Page S- 1

II - Flexible Premium Variable Life Form 86-01

Proposal Number: CHARLES
Proposal Date: August 1,
Initial Face Amount: 1,250,000.00

Employer: ABC Corporation
Owner: Charles Robertson
Insured: Charles Robertson
Class: Male, age 41, Non-Tobacco User

| Policy Year Beginning | Age At End Of Policy Year | Premium Paid By Employee | Net Premium Paid By Company | Company's Loan Balance To Employee | Company's Portion Of Surrender Value | Company's Death Benefit | Company's Salary Expense For Premium | Company's Salary Expense For Interest On Loan @ 2.78% | Income To Employer For Loan Interest | Company's Net Salary Expense |
|---|---|---|---|---|---|---|---|---|---|---|
| 8/1/ | 42 | | 4,780 | 13,220 | 10,125 | 500,000 | 4,780 | 198 | 198 | 4,063 |
| 8/1/2003 | 43 | 13,220 | 4,780 | 13,220 | 10,125 | 500,000 | 4,780 | 198 | 198 | 4,063 |
| 8/1/2004 | 44 | 5,076 | 12,924 | 26,144 | 26,144 | 500,000 | 5,076 | 561 | 561 | 4,315 |
| 8/1/2005 | 45 | 5,457 | 12,543 | 38,687 | 38,687 | 500,000 | 5,457 | 915 | 915 | 4,639 |
| 8/1/2006 | 46 | 5,922 | 12,078 | 50,765 | 50,765 | 500,000 | 5,922 | 1,257 | 1,257 | 5,034 |
|  |  | 6,472 | 11,528 | 62,292 | 62,292 | 500,000 | 6,472 | 1,584 | 1,584 | 5,501 |
| 8/1/2007 | 47 | 7,065 | 10,935 | 73,228 | 73,228 | 500,000 | 7,065 | 1,896 | 1,896 | 6,005 |
| 8/1/2008 | 48 | 7,741 | 10,259 | 83,486 | 83,486 | 500,000 | 7,741 | 2,190 | 2,190 | 6,580 |
| 8/1/2009 | 49 | 8,375 | 9,625 | 93,111 | 93,111 | 500,000 | 8,375 | 2,465 | 2,465 | 7,119 |
| 8/1/2010 | 50 | 9,010 | 8,990 | 102,101 | 102,101 | 500,000 | 9,010 | 2,723 | 2,723 | 7,659 |
| 8/1/2011 | 51 | 9,729 | 8,271 | 110,372 | 110,372 | 500,000 | 9,729 | 2,962 | 2,962 | 8,270 |
| 8/1/2012 | 52 | 10,660 | 7,340 | 117,712 | 117,712 | 500,000 | 10,660 | 3,178 | 3,178 | 9,061 |
| 8/1/2013 | 53 | 11,887 | 6,113 | 123,825 | 123,825 | 500,000 | 11,887 | 3,364 | 3,364 | 10,104 |
| 8/1/2014 | 54 | 13,536 | 4,464 | 128,289 | 128,289 | 500,000 | 13,536 | 3,509 | 3,509 | 11,506 |
| 8/1/2015 | 55 | 15,440 | 2,560 | 130,849 | 130,849 | 500,000 | 15,440 | 3,605 | 3,605 | 13,124 |
| 8/1/2016 | 56 | 17,555 | 445 | 131,295 | 131,295 | 500,000 | 17,555 | 3,644 | 3,644 | 14,922 |
| 8/1/2017 | 57 | 18,000 | 1,796- | 129,498 | 129,498 | 500,000 | 19,796 | 3,623 | 3,623 | 16,827 |
| 8/1/2018 | 58 | 18,000 | 3,996- | 125,502 | 125,502 | 500,000 | 21,996 | 3,540 | 3,540 | 18,697 |
| 8/1/2019 | 59 | 18,000 | 5,942- | 119,560 | 119,560 | 500,000 | 23,942 | 3,400 | 3,400 | 20,351 |
| 8/1/2020 | 60 | 18,000 | 7,634- | 111,927 | 111,927 | 500,000 | 25,634 | 3,209 | 3,209 | 21,789 |
| 8/1/2021 | 61 | 18,000 | 9,538- | 102,389 | 102,389 | 500,000 | 27,538 | 2,969 | 2,969 | 23,407 |
| 8/1/2022 | 62 | 18,000 | 12,076- | 90,313 | 90,313 | 500,000 | 30,076 | 2,665 | 2,665 | 25,564 |
| 8/1/2023 | 63 | 18,000 | 18,069- | 72,244 | 72,244 | 450,587 | 36,069 | 2,240 | 2,240 | 30,658 |
| 8/1/2024 | 64 | 18,000 | 29,040- | 43,205 | 43,205 | 331,175 | 47,040 | 1,573 | 1,573 | 39,984 |
| 8/1/2025 | 65 | 18,000 | 43,205- | 0 | 0 | 233,400 | 61,205 | 542 | 542 | 52,024 |

It is assumed the Joint Ownership Agreement is cancelled July 31, 2026 and the Employer's loan is fully paid.

| 8/1/2026 | 66 | 0 | 0 | 0 | 0 | 0 | 0 | 0 | 0 | 0 |
| 8/1/2027 | 67 | 0 | 0 | 0 | 0 | 0 | 0 | 0 | 0 | 0 |

\* Interest assumption based upon Applicable Federal Rate.

FIG. 19

* EMPLOYEE'S BENEFIT ANALYSIS *

Proposal Number: CHARLES  
Proposal Date: August 1,  
Initial Face Amount: 1,250,000.00  
Employer: ABC Corporation  
Owner: Charles Robertson  
Insured: Charles Robertson  
Class: Male, age 41, Non-Tobacco User

| Policy Year Beginning | Age At End Of Policy Year | Salary Bonus For Employee's Premium Share | Salary Bonus For Loan Interest @ 2.78% | Employee's Income Tax On Combined Bonus | Employee's Accumulated Tax On Combined Bonus | Company's Loan Balance To Employee | Employee's Cash Withdrawal | Employee's Loan** | Employee's Cash Surrender Value | Employee's Net Policy Death Benefit | Employee's Cost Basis |
|---|---|---|---|---|---|---|---|---|---|---|---|
| 8/1/2003 | 42 | 4,780 | 198 | 1,742 | 1,742 | 13,220 | 0 | 0 | 3,094- | 750,000 | 4,780 |
| 8/1/2004 | 43 | 5,076 | 561 | 1,973 | 3,716 | 26,144 | 0 | 0 | 119 | 750,000 | 9,856 |
| 8/1/2005 | 44 | 5,457 | 915 | 2,230 | 5,946 | 38,687 | 0 | 0 | 14,871 | 750,000 | 15,313 |
| 8/1/2006 | 45 | 5,922 | 1,257 | 2,513 | 8,458 | 50,765 | 0 | 0 | 17,354 | 750,000 | 21,235 |
| 8/1/2006 | 46 | 6,472 | 1,584 | 2,820 | 11,278 | 62,292 | 0 | 0 | 19,988 | 750,000 | 27,708 |
| 8/1/2007 | 47 | 7,065 | 1,896 | 3,136 | 14,414 | 73,228 | 0 | 0 | 31,778 | 750,000 | 34,772 |
| 8/1/2008 | 48 | 7,741 | 2,190 | 3,476 | 17,890 | 83,486 | 0 | 0 | 49,134 | 750,000 | 42,514 |
| 8/1/2009 | 49 | 8,375 | 2,465 | 3,794 | 21,684 | 93,111 | 0 | 0 | 63,175 | 750,000 | 50,889 |
| 8/1/2010 | 50 | 9,010 | 2,723 | 4,107 | 25,791 | 102,101 | 0 | 0 | 83,081 | 750,000 | 59,899 |
| 8/1/2011 | 51 | 9,729 | 2,962 | 4,442 | 30,233 | 110,372 | 0 | 0 | 105,996 | 750,000 | 69,628 |
| 8/1/2012 | 52 | 10,660 | 3,178 | 4,843 | 35,076 | 117,712 | 0 | 0 | 133,191 | 750,000 | 80,288 |
| 8/1/2013 | 53 | 10,887 | 3,364 | 5,338 | 40,414 | 123,025 | 0 | 0 | 163,540 | 750,000 | 92,175 |
| 8/1/2014 | 54 | 13,536 | 3,509 | 5,966 | 46,380 | 128,889 | 0 | 0 | 198,537 | 750,000 | 105,711 |
| 8/1/2015 | 55 | 15,440 | 3,505 | 5,665 | 53,045 | 130,809 | 0 | 0 | 238,702 | 750,000 | 121,151 |
| 8/1/2016 | 56 | 17,555 | 3,604 | 7,420 | 60,465 | 131,295 | 0 | 0 | 284,533 | 750,000 | 138,705 |
| 8/1/2017 | 57 | 19,796 | 3,623 | 8,197 | 68,662 | 129,498 | 0 | 0 | 336,470 | 750,000 | 158,502 |
| 8/1/2018 | 58 | 20,942 | 3,540 | 8,938 | 77,600 | 125,502 | 0 | 0 | 394,846 | 750,000 | 180,498 |
| 8/1/2019 | 59 | 25,434 | 3,409 | 9,570 | 87,169 | 119,560 | 0 | 0 | 459,796 | 750,000 | 204,440 |
| 8/1/2020 | 60 | 27,538 | 2,969 | 10,095 | 97,264 | 111,927 | 0 | 0 | 531,514 | 750,000 | 230,073 |
| 8/1/2021 | 61 | 27,538 | 2,969 | 10,677 | 107,942 | 102,389 | 0 | 0 | 610,714 | 750,000 | 257,611 |
| 8/1/2022 | 62 | 30,076 | 2,665 | 11,459 | 119,401 | 90,313 | 0 | 0 | 698,634 | 750,000 | 287,687 |
| 8/1/2023 | 63 | 36,069 | 2,240 | 13,408 | 132,809 | 72,244 | 0 | 0 | 799,413 | 799,413 | 323,756 |
| 8/1/2024 | 64 | 47,040 | 1,573 | 17,014 | 149,823 | 43,205 | 0 | 0 | 918,825 | 918,825 | 370,796 |
| 8/1/2025 | 65 | 31,205 | 542 | 21,611 | 171,435 | 0 | 0 | 0 | 1,060,910 | 1,060,910 | 432,000 |

It is assumed the Joint Ownership Agreement is cancelled July 31, 2026 and the Employer's loan is fully paid.

| | | | | | | | | | | | |
|---|---|---|---|---|---|---|---|---|---|---|---|
| 8/1/2026 | 66 | 0 | 0 | 0 | 171,435 | 0 | 95,808 | 0 | 1,046,627 | 1,255,952 | 336,192 |
| 8/1/2027 | 67 | 0 | 0 | 0 | 171,435 | 0 | 95,808 | 0 | 1,030,986 | 1,226,874 | 240,384 |
| 8/1/2028 | 68 | 0 | 0 | 0 | 171,435 | 0 | 95,808 | 0 | 1,013,574 | 1,196,618 | 144,576 |
| 8/1/2029 | 69 | 0 | 0 | 0 | 171,435 | 0 | 95,808 | 47,040 | 994,538 | 1,163,610 | 48,768 |
| 8/1/2030 | 70 | 0 | 0 | 0 | 171,435 | 0 | 48,768 | 95,808 | 973,398 | 1,137,120 | 0 |
| 8/1/2031 | 71 | 0 | 0 | 0 | 171,435 | 0 | 0 | 95,808 | 949,839 | 1,115,477 | 0 |
| 8/1/2032 | 72 | 0 | 0 | 0 | 171,435 | 0 | 0 | 95,808 | 924,149 | 1,078,769 | 0 |
| 8/1/2033 | 73 | 0 | 0 | 0 | 171,435 | 0 | 0 | 95,808 | 896,250 | 1,036,944 | 0 |
| 8/1/2034 | 74 | 0 | 0 | 0 | 171,435 | 0 | 0 | 95,808 | 866,122 | 989,724 | 0 |
| 8/1/2035 | 75 | 0 | 0 | 0 | 171,435 | 0 | 0 | 95,808 | 833,742 | 936,850 | 0 |
| 8/1/2036 | 76 | 0 | 0 | 0 | 171,435 | 0 | 0 | 95,808 | 799,191 | 878,108 | 0 |
| 8/1/2037 | 77 | 0 | 0 | 0 | 171,435 | 0 | 0 | 95,808 | 761,175 | 845,606 | 0 |
| 8/1/2038 | 78 | 0 | 0 | 0 | 171,435 | 0 | 0 | 95,808 | 719,309 | 809,509 | 0 |
| 8/1/2039 | 79 | 0 | 0 | 0 | 171,435 | 0 | 0 | 95,808 | 673,152 | 769,373 | 0 |
| 8/1/2040 | 80 | 0 | 0 | 0 | 171,435 | 0 | 0 | 95,808 | 622,223 | 724,728 | 0 |
| 8/1/2041 | 81 | 0 | 0 | 0 | 171,435 | 0 | 0 | 95,808 | 565,980 | 675,035 | 0 |
| 8/1/2042 | 82 | 0 | 0 | 0 | 171,435 | 0 | 0 | 95,808 | 503,821 | 619,692 | 0 |
| 8/1/2043 | 83 | 0 | 0 | 0 | 171,435 | 0 | 0 | 95,808 | 434,484 | 557,440 | 0 |
| 8/1/2044 | 84 | 0 | 0 | 0 | 171,435 | 0 | 0 | 95,808 | 358,486 | 486,823 | 0 |
| 8/1/2045 | 85 | 0 | 0 | 0 | 171,435 | 0 | 0 | 95,808 | 295,735 | 406,731 | 0 |
| 8/1/2046 | 86 | 0 | 0 | 0 | 171,435 | 0 | 0 | 95,808 | 275,450 | 421,489 | 0 |
| 8/1/2047 | 87 | 0 | 0 | 0 | 171,435 | 0 | 0 | 0 | 280,389 | 434,864 | 0 |

\* Interest assumption based upon Applicable Federal Rate  
\** Cash surrender values and death benefits reflect loan activity as shown.

FIG. 20

Data Prepared: CHARLES  
II - Flexible Premium Variable Life Form 86-01

SUMMARY OF BENEFITS ON THE LIFE OF CHARLES ROBERTSON  
@ PROGRAM TESTING  
Page S- 3

Proposal Number: CHARLES  
Proposal Date: August 1,  
Initial Face Amount: 1,250,000.00

Employer: ABC Corporation  
Owner: Charles Robertson  
Insured: Charles Robertson  
Class: Male, age 41, Non-Tobacco User

| Year Beginning | Annualized Cash Outlay | Accumulated Cash Outlay | Employee's Cash Surrender Value | Annualized Withdrawal/ Policy Loan | Employee's Tax Free Death Benefit | Employee's E.R.O.R. On Annual Cash Outlay* |
|---|---|---|---|---|---|---|
| 8/1/ | $1,742.49 | $1,742.49 | $3,094.30- | $0.00 | $750,000.00 | |
| 8/1/2003 | $1,973.06 | $3,715.55 | $118.61 | $0.00 | $750,000.00 | |
| 8/1/2004 | $2,230.20 | $5,945.75 | $4,871.38 | $0.00 | $750,000.00 | |
| 8/1/2005 | $2,512.51 | $8,458.26 | $11,353.97 | $0.00 | $750,000.00 | 15.95 |
| 8/1/2006 | $2,819.75 | $11,278.01 | $19,987.80 | $0.00 | $750,000.00 | 25.32 |
| 8/1/2007 | $3,136.07 | $14,414.08 | $31,777.83 | $0.00 | $750,000.00 | 29.22 |
| 8/1/2008 | $3,475.81 | $17,889.89 | $46,133.65 | $0.00 | $750,000.00 | 30.00 |
| 8/1/2009 | $3,794.23 | $21,684.12 | $63,175.48 | $0.00 | $750,000.00 | 29.46 |
| 8/1/2010 | $4,106.77 | $25,790.89 | $83,081.15 | $0.00 | $750,000.00 | 28.52 |
| 8/1/2011 | $4,442.00 | $30,232.89 | $105,995.67 | $0.00 | $750,000.00 | 27.39 |
| AGE 65 | $21,611.38 | $171,434.64 | $1,060,909.58 | $0.00 | $1,060,909.58 | 17.59 |
| AGE 75 | $0.00 | $171,434.64 | $833,742.49 | $95,807.98 | $936,849.81 | |
| AGE 85 | $0.00 | $171,434.64 | $268,734.67 | $95,807.98 | $406,731.13 | |
| AGE 95 | $0.00 | $171,434.64 | $279,633.20 | $0.00 | $327,903.71 | |

COST BASIS @65=$432,000.00 TAX FREE RETURN OF BASIS VIA WITHDRAWALS FOR 4.0 YEARS  
A 35% income tax bracket has been assumed.

* E.R.O.R. - Equivalent Rate Of Return. Isolates employee's monthly cash outlay (income tax on monthly bonus income) relative to his/her portion of the policy's projected year end cash surrender values. Rates of Return shown reflect interest rates necessary to produce similar values for the same monthly employee outlay into a non-insurance investment vehicle. RATES SHOWN ARE NOT REFLECTIVE OF THE POLICY'S OVERALL OR INTERNAL RATE OF RETURN. Isolation of employee's cash outlay may not be appropriate where employee is also an S-corporate shareholder, partner, or sole proprietor. Employee taxes on bonus income are withheld monthly regardless of premium mode.

This plan is offered by ABC CORPORATION. The company will pay all expenses for planned premium contributions and administrative fees. A portion of the cost of the plan will be added to your earned income each month so you will realize some income tax liability.

The benefits estimated above are based upon: (1) your acceptance as an insurable risk by Life Insurance Company; (2) current rates for mortality, interest, annuity purchase, and termination fees payable, and (3) continuation of the plan and planned premiums by ABC CORPORATION (the company reserves the right to cancel, modify and/or change this plan at any time). The summary plan description will more completely describe details.

The benefits and values are subject to the terms and conditions of the insurance policy and this brief summary does not change these terms and conditions. This summary is not valid without the full ledger illustration and accompanying footnotes.

The values and benefits are not guaranteed and are subject to change unless the column is marked guaranteed.

FIG. 21

```
Date Prepared:                                                                                                    Page A- 1
MSWESTB, LCPC19S2         4:33 PM          ® PROGRAM TESTING      Group: INTROLN6    Proposal Number: CHARLES Proposal Date:
Specified Face Amount:    1,250,000.00          2      II Agent:    Affiliate Insured:   Charles Robertson    Male Non-Tobacco User Age 41
Owner:     Charles Robertson    Tax Rate: 35.00
Employer:  ABC Corporation      Tax rate: 15.00  Specified D.B. = $500,000.00
Employee:  Charles Robertson Prepared for presentation in North Carolina
Use IRS Table 2001 rates for economic benefit
Calculate additional economic benefit for a maximum employer loan of $0.00,  calculated +464%
End joint ownership after age 65 or when the employer's loan returns to zero
Bonus employee for economic benefit cost
Endorsement Pay premium through age 65

Calc.   Prem.   Premium/
Age  Option  Mode            Cash Value
41     1     M              1,500.00

Effective      Policy                  Coverage          Employee/   E/ DB Prem Table  Flat                    Guideline Premiums
   Date    Seg. Yr. Mo Age               Amount          Employer   R  Opt Cat Rating  Rating    Mos.         Level         Single
   1       1   1  1  41  1,250,000.00  500,000.00 R    I   NTU      0      0   0.00/Y    0     18,044.60    216,426.95

Withdrawal/Loan Schedule
Beginning at age 65         95,807.98   Annual withdrawal through age 85 (calculated maximum leaving $50,000.00 at age 95),
                                        THE TARGET CASH VALUE WAS EXCEEDED TO PROVIDE THE FULL WITHDRAWAL/LOAN AMOUNT FOR THE DURATION REQUESTED
Beginning 8/01/2030                     Switch to loans, interest will accumulate Guaranteed Interest:  4.5% (General Account only)
Assumed Interest:     10% (8.3% Net)

Guideline Level Premium              1,503.71 Monthly            18,044.60 Annually
Guideline Single Premium           216,426.95
Target Premium                         966.67 Monthly            11,600.00 Annually
Minimum First Month Premium            806.94
Initial 7 pay premium                4,208.07 Monthly            50,496.74 Annually

THIS ILLUSTRATION IS FOR AGENT USE ONLY, NO COMPLIANT SECTION IS PRESENT
```

AFR = 5.85%

FIG. 22

Date Prepared:  
Flexible Premium Variable Life

® PROGRAM TESTING

PREMIUM SCHEDULE

Page A- 2

Proposal Number: CHARLES  
Proposal Date: August 1,  
Initial Face Amount: 1,250,000.00  
Monthly Premium: 1,500.00

Employer: ABC Corporation  
Owner: Charles Robertson  
Insured: Charles Robertson

L I F E   I N S U R A N C E   P A Y M E N T S

| Beginning Date | Employee Contribution | Planned Premium | | Total Planned Payments |
|---|---|---|---|---|
| | 0.00 | 1,500.00 | monthly | 18,000.00 |
| 8/01/2003 | 0.00 | 1,500.00 | monthly | 18,000.00 |
| 8/01/2004 | 0.00 | 1,500.00 | monthly | 18,000.00 |
| 8/01/2005 | 0.00 | 1,500.00 | monthly | 18,000.00 |
| 8/01/2006 | 0.00 | 1,500.00 | monthly | 18,000.00 |
| 8/01/2007 | 0.00 | 1,500.00 | monthly | 18,000.00 |
| 8/01/2008 | 0.00 | 1,500.00 | monthly | 18,000.00 |
| 8/01/2009 | 0.00 | 1,500.00 | monthly | 18,000.00 |
| 8/01/2010 | 0.00 | 1,500.00 | monthly | 18,000.00 |
| 8/01/2011 | 0.00 | 1,500.00 | monthly | 18,000.00 |
| 8/01/2012 | 0.00 | 1,500.00 | monthly | 18,000.00 |
| 8/01/2013 | 0.00 | 1,500.00 | monthly | 18,000.00 |
| 8/01/2014 | 0.00 | 1,500.00 | monthly | 18,000.00 |
| 8/01/2015 | 0.00 | 1,500.00 | monthly | 18,000.00 |
| 8/01/2016 | 0.00 | 1,500.00 | monthly | 18,000.00 |
| 8/01/2017 | 0.00 | 1,500.00 | monthly | 18,000.00 |
| 8/01/2018 | 0.00 | 1,500.00 | monthly | 18,000.00 |
| 8/01/2019 | 0.00 | 1,500.00 | monthly | 18,000.00 |
| 8/01/2020 | 0.00 | 1,500.00 | monthly | 18,000.00 |
| 8/01/2021 | 0.00 | 1,500.00 | monthly | 18,000.00 |
| 8/01/2022 | 0.00 | 1,500.00 | monthly | 18,000.00 |
| 8/01/2023 | 0.00 | 1,500.00 | monthly | 18,000.00 |
| 8/01/2024 | 0.00 | 1,500.00 | monthly | 18,000.00 |
| 8/01/2025 | 0.00 | 1,500.00 | monthly | 18,000.00 |
| 8/01/2026 | No further scheduled premium payments | | | |

FIG. 23

Date Prepared: © PROGRAM TESTING  * EMPLOYER'S BENEFIT ANALYSIS *  Page S- 1
II - Flexible Premium Variable Life Form 86-01

Proposal Number: CHARLES
Proposal Date: August 1,  Employer: ABC Corporation
Initial Face Amount: 1,250,000.00  Owner: Charles Robertson
Insured: Charles Robertson
Class: Male, age 41, Non-Tobacco User

| Policy Year Beginning | Age At End Of Policy Year | Net Premium Paid By Company | Premium Paid by Employee | Company's Loan Balance To Employee | Company's Portion Of Surrender Value | Company's Death Benefit | Company's Salary Expense For Premium | Company's Salary Expense For Interest On Loan @ 5.85% | Income To Employer For Loan Interest | Company's Net Salary Expense |
|---|---|---|---|---|---|---|---|---|---|---|
| 8/1/ | 42 | 13,220 | 4,780 | 13,220 | 10,125 | 500,000 | 4,780 | 415 | 415 | 4,063 |
| 8/1/2003 | 43 | 12,924 | 5,076 | 26,144 | 26,144 | 500,000 | 5,076 | 1,179 | 1,179 | 4,315 |
| 8/1/2004 | 44 | 12,543 | 5,457 | 38,687 | 38,687 | 500,000 | 5,457 | 1,923 | 1,923 | 4,639 |
| 8/1/2005 | 45 | 12,078 | 5,922 | 50,765 | 50,765 | 500,000 | 5,922 | 2,643 | 2,643 | 5,034 |
| 8/1/2006 | 46 | 11,528 | 6,472 | 62,292 | 62,292 | 500,000 | 6,472 | 3,332 | 3,332 | 5,501 |
| 8/1/2007 | 47 | 10,935 | 7,065 | 73,228 | 73,228 | 500,000 | 7,065 | 3,988 | 3,988 | 6,005 |
| 8/1/2008 | 48 | 10,259 | 7,741 | 83,486 | 83,486 | 500,000 | 7,741 | 4,606 | 4,606 | 6,580 |
| 8/1/2009 | 49 | 9,625 | 8,375 | 93,111 | 93,111 | 500,000 | 8,375 | 5,186 | 5,186 | 7,119 |
| 8/1/2010 | 50 | 8,990 | 9,010 | 102,101 | 102,101 | 500,000 | 9,010 | 5,729 | 5,729 | 7,659 |
| 8/1/2011 | 51 | 8,271 | 9,729 | 110,372 | 110,372 | 500,000 | 9,729 | 6,233 | 6,233 | 8,270 |
| 8/1/2012 | 52 | 7,340 | 10,660 | 117,712 | 117,712 | 500,000 | 10,660 | 6,687 | 6,687 | 9,061 |
| 8/1/2013 | 53 | 6,113 | 11,887 | 123,825 | 123,825 | 500,000 | 11,887 | 7,078 | 7,078 | 10,104 |
| 8/1/2014 | 54 | 4,464 | 13,536 | 128,289 | 128,289 | 500,000 | 13,536 | 7,384 | 7,384 | 11,506 |
| 8/1/2015 | 55 | 2,560 | 15,440 | 130,849 | 130,849 | 500,000 | 15,440 | 7,585 | 7,585 | 13,124 |
| 8/1/2016 | 56 | 445 | 17,555 | 131,295 | 131,295 | 500,000 | 17,555 | 7,669 | 7,669 | 14,922 |
| 8/1/2017 | 57 | 1,796- | 18,000 | 129,498 | 129,498 | 500,000 | 19,796 | 7,624 | 7,624 | 16,827 |
| 8/1/2018 | 58 | 3,996- | 18,000 | 125,502 | 125,502 | 500,000 | 21,996 | 7,450 | 7,450 | 18,697 |
| 8/1/2019 | 59 | 5,942- | 18,000 | 119,560 | 119,560 | 500,000 | 23,942 | 7,155 | 7,155 | 20,351 |
| 8/1/2020 | 60 | 7,634- | 18,000 | 111,927 | 111,927 | 500,000 | 25,634 | 6,754 | 6,754 | 21,789 |
| 8/1/2021 | 61 | 9,538- | 18,000 | 102,389 | 102,389 | 500,000 | 27,538 | 6,248 | 6,248 | 23,407 |
| 8/1/2022 | 62 | 12,076- | 18,000 | 90,313 | 90,313 | 500,000 | 30,076 | 5,610 | 5,610 | 25,564 |
| 8/1/2023 | 63 | 18,069- | 18,000 | 72,244 | 72,244 | 450,587 | 36,069 | 4,716 | 4,716 | 30,658 |
| 8/1/2024 | 64 | 29,040- | 18,000 | 43,205 | 43,205 | 331,175 | 47,040 | 3,314 | 3,314 | 39,984 |
| 8/1/2025 | 65 | 43,205- | 18,000 | 0 | 0 | 233,400 | 61,205 | 1,147 | 1,147 | 52,024 |
| 8/1/2026 | 66 | 0 | 0 | 0 | 0 | 0 | 0 | 0 | 0 | 0 |
| 8/1/2027 | 67 | 0 | 0 | 0 | 0 | 0 | 0 | 0 | 0 | 0 |

It is assumed the Joint Ownership Agreement is cancelled July 31, 2026 and the Employer's loan is fully paid.

* Interest assumption based upon Applicable Federal Rate.

FIG. 24

* EMPLOYEE'S BENEFIT ANALYSIS *

Date Prepared:

| Policy Year Beginning | Age At End Of Policy Year | Salary Bonus For Employee's Premium Share | Salary Bonus For Loan Interest @ 5.85% | Employee's Income Tax On Combined Bonus @ 35% | Employee's Accumulated Tax On Combined Bonus | Company's Loan Balance To Employee | Employee's Cash Withdrawal | Employee's Loan | Employee's Cash Surrender Value | Employee's Net Policy Death Benefit | Employee's Basis |
|---|---|---|---|---|---|---|---|---|---|---|---|
| 8/1/2003 | 42 | 4,780 | 415 | 1,818 | 1,818 | 13,220 | 0 | 0 | 3,094 | 750,000 | 4,780 |
| 8/1/2004 | 43 | 5,076 | 1,179 | 2,189 | 4,008 | 26,144 | 0 | 0 | 119 | 750,000 | 9,856 |
| 8/1/2005 | 44 | 5,457 | 1,923 | 2,583 | 6,591 | 38,687 | 0 | 0 | 4,871 | 750,000 | 15,313 |
| 8/1/2006 | 45 | 5,922 | 2,643 | 2,998 | 9,589 | 50,765 | 0 | 0 | 11,354 | 750,000 | 21,235 |
| 8/1/2006 | 46 | 6,472 | 3,332 | 3,431 | 13,020 | 62,292 | 0 | 0 | 19,988 | 750,000 | 27,708 |
| 8/1/2007 | 47 | 7,065 | 3,988 | 3,868 | 16,888 | 73,228 | 0 | 0 | 31,778 | 750,000 | 34,772 |
| 8/1/2008 | 48 | 7,741 | 4,606 | 4,322 | 21,210 | 83,486 | 0 | 0 | 46,134 | 750,000 | 42,514 |
| 8/1/2009 | 49 | 7,375 | 5,349 | 4,747 | 25,956 | 93,486 | 0 | 0 | 63,175 | 750,000 | 50,889 |
| 8/1/2010 | 50 | 8,310 | 5,729 | 5,159 | 31,115 | 102,101 | 0 | 0 | 83,081 | 750,000 | 59,899 |
| 8/1/2011 | 51 | 9,729 | 6,233 | 5,587 | 36,702 | 110,372 | 0 | 0 | 105,996 | 750,000 | 69,628 |
| 8/1/2012 | 52 | 10,660 | 6,687 | 6,071 | 42,773 | 117,712 | 0 | 0 | 133,191 | 750,000 | 80,288 |
| 8/1/2013 | 53 | 11,887 | 7,078 | 6,638 | 49,411 | 123,825 | 0 | 0 | 163,540 | 750,000 | 92,175 |
| 8/1/2014 | 54 | 13,536 | 7,384 | 7,322 | 56,733 | 128,289 | 0 | 0 | 198,537 | 750,000 | 105,711 |
| 8/1/2015 | 55 | 15,440 | 7,585 | 8,059 | 64,792 | 130,849 | 0 | 0 | 236,702 | 750,000 | 121,151 |
| 8/1/2016 | 56 | 17,555 | 7,669 | 8,828 | 73,620 | 131,295 | 0 | 0 | 284,533 | 750,000 | 138,705 |
| 8/1/2017 | 57 | 19,796 | 7,624 | 9,597 | 83,217 | 129,498 | 0 | 0 | 336,470 | 750,000 | 158,502 |
| 8/1/2018 | 58 | 21,996 | 7,450 | 10,306 | 93,524 | 125,502 | 0 | 0 | 394,846 | 750,000 | 180,498 |
| 8/1/2019 | 59 | 23,942 | 7,155 | 10,884 | 104,408 | 119,560 | 0 | 0 | 459,796 | 750,000 | 204,440 |
| 8/1/2020 | 60 | 25,634 | 6,754 | 11,336 | 115,743 | 111,927 | 0 | 0 | 531,714 | 750,000 | 230,073 |
| 8/1/2021 | 61 | 27,538 | 6,248 | 11,825 | 127,569 | 102,389 | 0 | 0 | 610,714 | 750,000 | 257,611 |
| 8/1/2022 | 62 | 30,076 | 5,610 | 12,490 | 140,059 | 90,313 | 0 | 0 | 698,634 | 750,000 | 287,687 |
| 8/1/2023 | 63 | 36,069 | 4,316 | 14,275 | 154,333 | 72,244 | 0 | 0 | 799,413 | 799,413 | 323,756 |
| 8/1/2024 | 64 | 47,040 | 3,314 | 17,624 | 171,957 | 43,205 | 0 | 0 | 918,825 | 918,825 | 370,795 |
| 8/1/2025 | 65 | 61,205 | 1,147 | 21,823 | 193,780 | 0 | 0 | 0 | 1,060,910 | 1,060,910 | 432,000 |

It is assumed the Joint Ownership Agreement is cancelled July 31, 2026 and the Employer's loan is fully paid.

| 8/1/2026 | 66 | 0 | 0 | 0 | 193,780 | 0 | 95,808 | 0 | 1,046,627 | 1,255,952 | 336,192 |
| 8/1/2027 | 67 | 0 | 0 | 0 | 193,780 | 0 | 95,808 | 0 | 1,030,986 | 1,226,874 | 240,384 |
| 8/1/2028 | 68 | 0 | 0 | 0 | 193,780 | 0 | 95,808 | 0 | 1,013,574 | 1,196,018 | 144,576 |
| 8/1/2029 | 69 | 0 | 0 | 0 | 193,780 | 0 | 95,808 | 0 | 994,538 | 1,163,610 | 48,768 |
| 8/1/2030 | 70 | 0 | 0 | 0 | 193,780 | 0 | 48,768 | 47,040 | 974,335 | 1,135,477 | 0 |
| 8/1/2031 | 71 | 0 | 0 | 0 | 193,780 | 0 | 0 | 95,808 | 949,835 | 1,115,477 | 0 |
| 8/1/2032 | 72 | 0 | 0 | 0 | 193,780 | 0 | 0 | 95,808 | 924,149 | 1,078,769 | 0 |
| 8/1/2033 | 73 | 0 | 0 | 0 | 193,780 | 0 | 0 | 95,808 | 896,258 | 1,036,944 | 0 |
| 8/1/2034 | 74 | 0 | 0 | 0 | 193,780 | 0 | 0 | 95,808 | 866,122 | 989,724 | 0 |
| 8/1/2035 | 75 | 0 | 0 | 0 | 193,780 | 0 | 0 | 95,808 | 833,742 | 936,850 | 0 |
| 8/1/2036 | 76 | 0 | 0 | 0 | 193,780 | 0 | 0 | 95,808 | 799,191 | 878,108 | 0 |
| 8/1/2037 | 77 | 0 | 0 | 0 | 193,780 | 0 | 0 | 95,808 | 761,175 | 845,606 | 0 |
| 8/1/2038 | 78 | 0 | 0 | 0 | 193,780 | 0 | 0 | 95,808 | 719,309 | 809,506 | 0 |
| 8/1/2039 | 79 | 0 | 0 | 0 | 193,780 | 0 | 0 | 95,808 | 673,152 | 769,373 | 0 |
| 8/1/2040 | 80 | 0 | 0 | 0 | 193,780 | 0 | 0 | 95,808 | 622,223 | 724,728 | 0 |
| 8/1/2041 | 81 | 0 | 0 | 0 | 193,780 | 0 | 0 | 95,808 | 565,980 | 675,035 | 0 |
| 8/1/2042 | 82 | 0 | 0 | 0 | 193,780 | 0 | 0 | 95,808 | 503,821 | 619,692 | 0 |
| 8/1/2043 | 83 | 0 | 0 | 0 | 193,780 | 0 | 0 | 95,808 | 434,478 | 559,440 | 0 |
| 8/1/2044 | 84 | 0 | 0 | 0 | 193,780 | 0 | 0 | 95,808 | 356,484 | 486,823 | 0 |
| 8/1/2045 | 85 | 0 | 0 | 0 | 193,780 | 0 | 0 | 95,808 | 265,735 | 406,731 | 0 |
| 8/1/2046 | 86 | 0 | 0 | 0 | 193,780 | 0 | 0 | 95,808 | 275,450 | 421,489 | 0 |
| 8/1/2047 | 87 | 0 | 0 | 0 | 193,780 | 0 | 0 | 0 | 280,389 | 434,864 | 0 |
| 8/1/2048 | 88 | 0 | 0 | 0 | 193,780 | 0 | 0 | 0 | 283,074 | 446,383 | 0 |
| 8/1/2049 | 89 | 0 | 0 | 0 | 193,780 | 0 | 0 | 0 | 282,983 | 455,530 | 0 |
| 8/1/2050 | 90 | 0 | 0 | 0 | 193,780 | 0 | 0 | 0 | 279,504 | 461,700 | 0 |
| 8/1/2051 | 91 | 0 | 0 | 0 | 193,780 | 0 | 0 | 0 | 271,976 | 464,233 | 0 |
| 8/1/2052 | 92 | 0 | 0 | 0 | 193,780 | 0 | 0 | 0 | 266,469 | 428,926 | 0 |
| 8/1/2053 | 93 | 0 | 0 | 0 | 193,780 | 0 | 0 | 0 | 268,506 | 393,362 | 0 |
| 8/1/2054 | 94 | 0 | 0 | 0 | 193,780 | 0 | 0 | 0 | 268,081 | 359,066 | 0 |
| 8/1/2055 | 95 | 0 | 0 | 0 | 193,780 | 0 | 0 | 0 | 279,633 | 327,904 | 0 |

\* Interest assumption based upon Applicable Federal Rate.

\*\* Cash surrender values and death benefits reflect loan activity as shown.

FIG. 25

Date Prepared:

SUMMARY OF BENEFITS ON THE LIFE OF CHARLES ROBERTSON
® PROGRAM TESTING

Page S- 3

II - Flexible Premium Variable Life Form 86-01

Proposal Number: CHARLES
Proposal Date: August 1,
Initial Face Amount: 1,250,000.00

Employer: ABC Corporation
Owner: Charles Robertson
Insured: Charles Robertson
Class: Male, age 41, Non-Tobacco User

| Year Beginning | Annualized Cash Outlay | Accumulated Cash Outlay | Employee's Cash Surrender Value | Annualized Withdrawal/ Policy Loan | Employee's Tax Free Death Benefit | Employee' E.R.O.R. On Annual Cash Outlay* |
|---|---|---|---|---|---|---|
| 8/1/ | $1,818.46 | $3,094.30- | $0.00 | $750,000.00 | | |
| 8/1/2003 | $2,189.36 | $118.61 | $0.00 | $750,000.00 | | |
| 8/1/2004 | $2,583.18 | $4,007.82 | $0.00 | $750,000.00 | | |
| 8/1/2005 | $2,997.60 | $4,871.38 | $0.00 | $750,000.00 | | |
| 8/1/2006 | $3,431.45 | $6,591.00 | $0.00 | $750,000.00 | | |
| 8/1/2007 | $3,868.24 | $9,588.60 | $0.00 | $750,000.00 | 9.38 | |
| 8/1/2008 | $4,321.58 | $13,020.05 | $0.00 | $750,000.00 | 19.47 | |
| 8/1/2009 | $4,746.59 | $16,888.29 | $0.00 | $750,000.00 | 24.07 | |
| 8/1/2010 | $5,158.89 | $21,209.87 | $0.00 | $750,000.00 | 25.40 | |
| 8/1/2011 | $5,586.60 | $25,956.46 | $0.00 | $750,000.00 | 25.40 | |
| | | $31,115.35 | | | 24.82 | |
| | | $36,701.95 | | | 24.00 | |
| AGE 65 | $21,823.09 | $1,060,909.58 | $0.00 | $1,060,909.58 | 16.30 | |
| AGE 75 | $0.00 | $833,742.49 | $95,807.98 | $936,849.81 | | |
| AGE 85 | $0.00 | $268,734.67 | $95,807.98 | $406,731.13 | | |
| AGE 95 | $0.00 | $279,633.20 | $0.00 | $327,903.71 | | |

COST BASIS @65=$432,000.00 TAX FREE RETURN OF BASIS VIA WITHDRAWALS FOR 4.0 YEARS
A 35% income tax bracket has been assumed.

* E.R.O.R. - Equivalent Rate of Return. Isolates employee's monthly cash outlay (income tax on monthly bonus income) relative to his/her portion of the policy's projected year end cash surrender values. Rates of Return shown reflect interest rates necessary to produce similar values for the same monthly employee outlay into a non-insurance investment vehicle. RATES SHOWN ARE NOT REFLECTIVE OF THE POLICY'S OVERALL OR INTERNAL RATE OF RETURN. Isolation of employee's cash outlay may not be appropriate where employee is also an S-corporate shareholder, partner, or sole proprietor. Employee taxes on bonus income are withheld monthly regardless of premium mode.

This plan is offered by ABC CORPORATION. The company will pay all expenses for planned premium contributions and administrative fees. A portion of the cost of the plan will be added to your earned income each month so you will realize some income tax liability.

The benefits estimated above are based upon: (1) your acceptance as an insurable risk by Life Insurance Company, (2) current rates for mortality, interest, annuity purchase, and termination fees payable, and (3) continuation of the plan and planned premiums by ABC CORPORATION (the company reserves the right to cancel, modify and/or change this plan at any time). The summary plan description will more completely describe details.

The benefits and values are subject to the terms and conditions of the insurance policy and this brief summary does not change these terms and conditions. This summary is not valid without the full ledger illustration and accompanying footnotes.

The values and benefits are not guaranteed and are subject to change unless the column is marked guaranteed.

FIG. 26

```
Date Prepared:                    © PROGRAM TESTING                                                          Page A- 1
MSWESTB, LCPC19S2  RMACON, LCPC19S2   4:34 PM           Group: INTRO35    Proposal Number: CHARLES 35

Proposal Date:                          2    II
Calculated Face Amount:    1,745,173.00 (5% above minimum)

Agent:      Affiliate

Insured:  Charles Robertson    Male Non-Tobacco User Age 35
Owner:    Charles Robertson    Tax Rate: 35.00
Employer: ABC Corporation      Tax rate: 15.00  Specified D.B. = $436,293.00 (25% of face)
Employee: Charles Robertson Prepared for presentation in North Carolina
Use IRS Table 2001 rates for economic benefit
Calculate additional economic benefit for a maximum employer loan of $0.00, calculated +273%
End joint ownership after age 65 or when the employer's loan returns to zero
Bonus employee for economic benefit cost
Endorsement Pay premium through age 65
```

M35

AFR + 5.85%

```
         Calc.  Prem.      Premium/
         Option Mode       Cash Value
Age 35    1      M          1,500.00

Effective  Policy              Coverage      Employee/ E/ DB Prem Table Flat              Guideline Premiums
  Date   Seg. Yr. Mo Age       Amount        Employer  R  Opt Cat Rating Rating  Mos.    Level           Single
    1     1   1  35 1,745,173.00  436,293.00 R  I  NTU   0   0.00/Y   0   18,947.37   228,077.04

8/01/2032  2  31  1  65  1,878,219.96  436,293.00 R  I  NTU   0   0.00/Y   0       0    25,928.33    291,326.17

Withdrawal/Loan Schedule
Beginning at age 65     169,136.53    Annual withdrawal through age 85 (calculated maximum leaving $50,000.00 at age 95),
                                      THE TARGET CASH VALUE WAS EXCEEDED TO PROVIDE THE FULL WITHDRAWAL/LOAN AMOUNT FOR THE DURATION REQUESTED
Beginning 8/01/2035                   Switch to loans, interest will accumulate Guaranteed Interest: 4.5% (General Account only)
Assumed Interest:    10% (8.3% Net)

Guideline Level Premium          1,578.94 Monthly        18,947.37 Annually
Guideline Single Premium       228,077.04
Target Premium                     948.22 Monthly        11,378.53 Annually
Minimum First Month Premium        770.25
Initial 7 Pay premium            4,688.69 Monthly        56,264.18 Annually

THIS ILLUSTRATION IS FOR AGENT USE ONLY, NO COMPLIANT SECTION IS PRESENT
```

FIG. 27

Date Prepared: @ PROGRAM TESTING * EMPLOYER'S BENEFIT ANALYSIS * Page S- 1

II - Flexible Premium Variable Life Form 86-01

Proposal Number: CHARLES 35  
Proposal Date: August 1,  
Initial Face Amount: 1,745,173.00

Employer: ABC Corporation  
Owner: Charles Robertson  
Insured: Charles Robertson  
Class: Male, age 35, Non-Tobacco User

| Policy Year Beginning | Age At End Of Policy Year | Net Premium Paid By Company | Premium Paid by Employee | Company's Loan Balance To Employee | Company's Portion Of Surrender Value | Company's Death Benefit | Company's Salary Expense For Premium | Company's Salary Expense For Interest On Loan @ 5.85% * | Income To Employer For Loan Interest | Company's Net Salary Expense |
|---|---|---|---|---|---|---|---|---|---|---|
| 8/1/2003 | 36 | 13,166 | 4,834 | 13,166 | 10,097 | 436,293 | 4,834 | 414 | 414 | 4,109 |
| 8/1/2004 | 37 | 13,069 | 4,931 | 26,235 | 26,235 | 436,293 | 4,931 | 1,181 | 1,181 | 4,192 |
| 8/1/2005 | 38 | 12,922 | 5,078 | 39,157 | 39,157 | 436,293 | 5,078 | 1,941 | 1,941 | 4,316 |
| 8/1/2006 | 39 | 12,825 | 5,175 | 51,982 | 51,982 | 436,293 | 5,175 | 2,694 | 2,694 | 4,399 |
| 8/1/2006 | 40 | 12,776 | 5,224 | 64,758 | 64,758 | 436,293 | 5,224 | 3,442 | 3,442 | 4,440 |
| 8/1/2007 | 41 | 12,629 | 5,371 | 77,387 | 77,387 | 436,293 | 5,371 | 4,185 | 4,185 | 4,565 |
| 8/1/2008 | 42 | 12,483 | 5,517 | 89,870 | 89,870 | 436,293 | 5,517 | 4,919 | 4,919 | 4,690 |
| 8/1/2009 | 43 | 12,141 | 5,859 | 102,012 | 102,012 | 436,293 | 5,859 | 5,639 | 5,639 | 4,980 |
| 8/1/2010 | 44 | 11,702 | 6,298 | 113,713 | 113,713 | 436,293 | 6,298 | 6,335 | 6,335 | 5,353 |
| 8/1/2011 | 45 | 11,165 | 6,835 | 124,878 | 124,878 | 436,293 | 6,835 | 7,003 | 7,003 | 5,810 |
| 8/1/2012 | 46 | 10,530 | 7,470 | 135,408 | 135,408 | 436,293 | 7,470 | 7,636 | 7,636 | 6,350 |
| 8/1/2013 | 47 | 9,846 | 8,154 | 145,254 | 145,254 | 436,293 | 8,154 | 8,231 | 8,231 | 6,930 |
| 8/1/2014 | 48 | 9,065 | 8,935 | 154,320 | 154,320 | 436,293 | 8,935 | 8,782 | 8,782 | 7,594 |
| 8/1/2015 | 49 | 8,333 | 9,667 | 162,653 | 162,653 | 436,293 | 9,667 | 9,289 | 9,289 | 8,217 |
| 8/1/2016 | 50 | 7,601 | 10,399 | 170,254 | 170,254 | 436,293 | 10,399 | 9,754 | 9,754 | 8,839 |
| 8/1/2017 | 51 | 6,771 | 11,229 | 177,025 | 177,025 | 436,293 | 11,229 | 10,173 | 10,173 | 9,545 |
| 8/1/2018 | 52 | 5,697 | 12,303 | 182,722 | 182,722 | 436,293 | 12,303 | 10,535 | 10,535 | 10,458 |
| 8/1/2019 | 53 | 4,281 | 13,719 | 187,003 | 187,003 | 436,293 | 13,719 | 10,824 | 10,824 | 11,661 |
| 8/1/2020 | 54 | 2,377 | 15,623 | 189,380 | 189,380 | 436,293 | 15,623 | 11,014 | 11,014 | 13,280 |
| 8/1/2021 | 55 | 180 | 17,820 | 189,560 | 189,560 | 436,293 | 17,820 | 11,084 | 11,084 | 15,147 |
| 8/1/2022 | 56 | 2,261- | 18,000 | 187,299 | 187,299 | 436,293 | 20,261 | 11,018 | 11,018 | 17,222 |
| 8/1/2023 | 57 | 4,849- | 18,000 | 182,450 | 182,450 | 436,293 | 22,849 | 10,805 | 10,805 | 19,421 |
| 8/1/2024 | 58 | 7,387- | 18,000 | 175,062 | 175,062 | 436,293 | 25,387 | 10,441 | 10,441 | 21,579 |
| 8/1/2025 | 59 | 9,633- | 18,000 | 165,429 | 165,429 | 436,293 | 27,633 | 9,939 | 9,939 | 23,488 |
| 8/1/2026 | 60 | 11,586- | 18,000 | 153,843 | 153,843 | 436,293 | 29,586 | 9,314 | 9,314 | 25,148 |
| 8/1/2027 | 61 | 13,783- | 18,000 | 140,060 | 140,060 | 436,293 | 31,783 | 8,567 | 8,567 | 27,015 |
| 8/1/2028 | 62 | 18,822- | 18,000 | 121,239 | 121,239 | 436,293 | 36,822 | 7,602 | 7,602 | 31,299 |
| 8/1/2029 | 63 | 27,571- | 18,000 | 93,667 | 93,667 | 436,293 | 45,571 | 6,226 | 6,226 | 38,735 |
| 8/1/2030 | 64 | 39,246- | 18,000 | 54,422 | 54,422 | 436,293 | 57,246 | 4,247 | 4,247 | 48,659 |
| 8/1/2031 | 65 | 54,422- | 18,000 | 0 | 0 | 413,209 | 72,422 | 1,441 | 1,441 | 61,558 |
| 8/1/2032 | 66 | 0 | 0 | 0 | 0 | 0 | 0 | 0 | 0 | 0 |
| 8/1/2033 | 67 | 0 | 0 | 0 | 0 | 0 | 0 | 0 | 0 | 0 |

It is assumed the Joint Ownership Agreement is cancelled July 31, 2032 and the Employer's loan is fully paid.

* Interest assumption based upon Applicable Federal Rate.

FIG. 28

Date Prepared:  SUMMARY OF BENEFITS ON THE LIFE OF CHARLES ROBERTSON  Page S- 4
© PROGRAM TESTING II - Flexible Premium Variable Life Form 86-01

Proposal Number: CHARLES 35           Employer: ABC Corporation
Proposal Date:   August 1,            Owner: Charles Robertson
Initial Face Amount: 1,745,173.00     Insured: Charles Robertson
                                      Class: Male, age 35, Non-Tobacco User

| | Year Beginning | Annualized Cash Outlay | Accumulated Cash Outlay | Employee's Cash Surrender Value | Annualized Withdrawal/ Policy Loan | Employee's Tax Free Death Benefit | Employee's E.R.O.R. On Annual Cash Outlay* |
|---|---|---|---|---|---|---|---|
| 8/1/ | $1,836.56 | $1,836.56 | $3,068.86- | $0.00 | $1,308,880.00 | | |
| 8/1/2003 | $2,139.21 | $3,975.77 | $263.43 | $0.00 | $1,308,880.00 | | |
| 8/1/2004 | $2,456.42 | $6,432.19 | $4,921.36 | $0.00 | $1,308,880.00 | | |
| 8/1/2005 | $2,754.08 | $9,186.27 | $11,066.10 | $0.00 | $1,308,880.00 | | |
| 8/1/2006 | $3,033.19 | $12,219.46 | $18,873.52 | $0.00 | $1,308,880.00 | 10.08 | |
| 8/1/2007 | $3,344.56 | $15,564.02 | $29,432.47 | $0.00 | $1,308,880.00 | 19.23 | |
| 8/1/2008 | $3,652.73 | $19,216.75 | $41,936.64 | $0.00 | $1,308,880.00 | 23.53 | |
| 8/1/2009 | $4,024.10 | $23,240.85 | $56,837.22 | $0.00 | $1,308,880.00 | 24.67 | |
| 8/1/2010 | $4,421.70 | $27,662.55 | $74,309.16 | $0.00 | $1,308,880.00 | 24.19 | |
| 8/1/2011 | $4,843.39 | $32,505.94 | $94,635.22 | $0.00 | $1,308,880.00 | 23.53 | |
| AGE 65 | $25,851.74 | $264,135.73 | $1,878,219.96 | $0.00 | $1,878,219.96 | 14.76 | |
| AGE 75 | $0.00 | $264,135.73 | $1,494,175.56 | $169,136.53 | $1,700,680.07 | | |
| AGE 85 | $0.00 | $264,135.73 | $543,438.19 | $168,744.31 | $819,445.72 | | |
| AGE 95 | $0.00 | $264,135.73 | $706,053.41 | $0.00 | $803,215.42 | | |

COST BASIS @65=$540,000.00 TAX FREE RETURN OF BASIS VIA WITHDRAWALS FOR 3.0 YEARS
A 35% income tax bracket has been assumed.

* E.R.O.R. - Equivalent Rate Of Return. Isolates employee's monthly cash outlay (income tax on monthly bonus income) relative to his/her portion of the policy's projected year end cash surrender values. Rates of Return shown reflect interest rates necessary to produce similar values for the same monthly employee outlay into a non-insurance investment vehicle. RATES SHOWN ARE NOT REFLECTIVE OF THE POLICY'S OVERALL OR INTERNAL RATE OF RETURN. Isolation of employee's cash outlay may not be appropriate where employee is also an S-corporate shareholder, partner, or sole proprietor. Employee taxes on bonus income are withheld monthly regardless of premium mode.

This plan is offered by ABC CORPORATION. The company will pay all expenses for planned premium contributions and administrative fees. A portion of the cost of the plan will be added to your earned income each month so you will realize some income tax liability.

The benefits estimated above are based upon: (1) your acceptance as an insurable risk by Life Insurance Company, (2) current rates for mortality, interest, annuity purchase, and termination fees payable, and (3) continuation of the plan and planned premiums by ABC CORPORATION (the company reserves the right to cancel, modify and/or change this plan at any time). The summary plan description will more completely describe details.

The benefits and values are subject to the terms and conditions of the insurance policy and this brief summary does not change these terms and conditions. This summary is not valid without the full ledger illustration and accompanying footnotes.

The values and benefits are not guaranteed and are subject to change unless the column is marked guaranteed.

FIG. 29

Page A- 1

Date Prepared: August 21,                    © PROGRAM TESTING
MSWESTB, LCFC1952   LCFC1952   4:44 PM       Group: INTROPAR   Proposal Number: CHARLES Proposal Date:
Specified Face Amount:           1,250,000.00           2    II Agent:      Affiliate Insured:  Charles Robertson    Male Non-Tobacco User Age 41
Owner:    Charles Robertson    Tax Rate: 35.00
Employer: ABC Corporation      Tax rate: 15.00
Employee: Charles Robertson Prepared for presentation in North Carolina
The initial premium split is 37.2% from the employee and 62.8% from the employer
Calculate additional premium share beginning in year 2 for a maximum employer ownership interest of $0.00, calculated +.2283% monthly
End joint ownership after age 65 or when the employer's ownership interest returns to zero
Bonus employee for premium share cost
Endorsement Pay premium through age 65

Calc. Prem.  Premium/
Age  Option  Mode    Cash Value
 41    1     M       1,500.00

Effective    Policy              Coverage        Employee/ E/ DB Prem Table Flat                        Guideline Premiums
  Date    Seg. Yr. Mo Age         Amount         Employer  R  Opt Cat Rating Rating Mos.           Level              Single
   1      1   1  1  41     1,250,000.00           0.00 R   I  NTU  0    0.00/Y    0    18,044.60    216,426.95

Withdrawal/Loan Schedule
Beginning at age 65      94,750.16    Annual withdrawal through age 85 (calculated maximum leaving $50,000.00 at age 95),
                                      THE TARGET CASH VALUE WAS EXCEEDED TO PROVIDE THE FULL WITHDRAWAL/LOAN AMOUNT FOR THE DURATION REQUESTED
Beginning 8/01/2031                   Switch to loans, interest will accumulate Guaranteed Interest:  4.5% (General Account only)
Assumed Interest:    10% (8.3% Net)

Guideline Level Premium             1,503.71 Monthly          18,044.60 Annually
Guideline Single Premium          216,426.95
Target Premium                        966.67 Monthly          11,600.00 Annually
Minimum First Month Premium           806.94
Initial 7 Pay Premium               4,208.07 Monthly          50,496.74 Annually

THIS ILLUSTRATION IS FOR AGENT USE ONLY, NO COMPLIANT SECTION IS PRESENT

FIG. 30

Date Prepared: August 21,  \*\*\* EMPLOYER BENEFIT ANALYSIS \*\*\*  Page S- 1
© PROGRAM TESTING II - Flexible Premium Variable Life Form 86-01

Proposal Number: CHARLES
Proposal Date: August 1,  Employer: ABC Corporation
Initial Face Amount: 1,250,000.00  Owner: Charles Robertson
Insured: Charles Robertson
Class: Male, age 41, Non-Tobacco User

| Policy Year Beginning | Age At End Of Policy Year | Premium Paid By Company | Premium Paid by Employee | Company Share Percentage | Company's Portion Of Surrender Value | Company's Death Benefit | Cost Basis Adjustment | Income From Buyout | Adjusted Cost Basis | Company's Salary Expense | Company's Net Salary Expense |
|---|---|---|---|---|---|---|---|---|---|---|---|
| 8/1/ | 42 | 11,304 | 6,696 | 62.80 | 6,359 | 785,000 | 0 | 0 | 11,304 | 6,696 | 5,692 |
| 8/1/2003 | 43 | 11,078 | 6,922 | 60.06 | 15,773 | 750,750 | 760 | 0 | 21,622 | 7,436 | 6,321 |
| 8/1/2004 | 44 | 10,585 | 7,415 | 57.32 | 24,967 | 716,500 | 1,254 | 0 | 30,953 | 8,388 | 7,130 |
| 8/1/2005 | 45 | 10,092 | 7,908 | 54.58 | 33,904 | 682,250 | 1,747 | 0 | 39,298 | 9,374 | 7,968 |
| 8/1/2006 | 46 | 9,599 | 8,401 | 51.84 | 42,654 | 648,000 | 2,240 | 0 | 46,657 | 10,399 | 8,839 |
| 8/1/2007 | 47 | 9,105 | 8,895 | 49.10 | 51,558 | 613,750 | 2,733 | 0 | 53,029 | 11,493 | 9,769 |
| 8/1/2008 | 48 | 8,612 | 9,388 | 46.36 | 60,092 | 579,500 | 3,195 | 32 | 58,447 | 12,636 | 10,741 |
| 8/1/2009 | 49 | 8,119 | 9,881 | 43.62 | 68,172 | 545,250 | 3,500 | 226 | 63,066 | 13,834 | 11,759 |
| 8/1/2010 | 50 | 7,626 | 10,374 | 40.88 | 75,702 | 511,000 | 3,766 | 475 | 66,926 | 15,090 | 12,827 |
| 8/1/2011 | 51 | 7,133 | 10,867 | 38.14 | 82,523 | 476,750 | 4,009 | 766 | 70,050 | 16,409 | 13,947 |
| 8/1/2012 | 52 | 6,640 | 11,360 | 35.40 | 88,820 | 442,500 | 4,224 | 1,111 | 72,466 | 17,805 | 15,135 |
| 8/1/2013 | 53 | 6,147 | 11,853 | 32.66 | 93,853 | 408,250 | 4,445 | 1,482 | 74,168 | 19,262 | 16,373 |
| 8/1/2014 | 54 | 5,654 | 12,346 | 29.92 | 97,786 | 374,000 | 4,669 | 1,891 | 75,152 | 20,798 | 17,679 |
| 8/1/2015 | 55 | 5,160 | 12,840 | 27.19 | 100,481 | 339,875 | 4,911 | 2,335 | 75,402 | 22,421 | 19,058 |
| 8/1/2016 | 56 | 4,667 | 13,333 | 24.45 | 101,670 | 305,625 | 5,191 | 2,806 | 74,878 | 24,136 | 20,516 |
| 8/1/2017 | 57 | 4,174 | 13,826 | 21.71 | 101,162 | 271,375 | 5,535 | 3,297 | 73,517 | 25,954 | 22,061 |
| 8/1/2018 | 58 | 3,681 | 14,319 | 18.97 | 98,710 | 237,125 | 5,980 | 3,792 | 71,218 | 27,883 | 23,701 |
| 8/1/2019 | 59 | 3,188 | 14,812 | 16.26 | 94,029 | 202,875 | 6,576 | 4,273 | 67,830 | 29,934 | 25,444 |
| 8/1/2020 | 60 | 2,695 | 15,305 | 13.49 | 86,800 | 168,625 | 7,394 | 4,709 | 63,131 | 32,118 | 27,300 |
| 8/1/2021 | 61 | 2,202 | 15,798 | 10.75 | 76,659 | 134,375 | 8,543 | 5,054 | 56,789 | 34,449 | 29,282 |
| 8/1/2022 | 62 | 1,709 | 16,291 | 8.01 | 63,195 | 100,125 | 10,189 | 5,230 | 48,309 | 36,941 | 31,400 |
| 8/1/2023 | 63 | 1,215 | 16,785 | 5.27 | 45,936 | 65,875 | 12,625 | 5,102 | 36,899 | 39,613 | 33,671 |
| 8/1/2024 | 64 | 722 | 17,278 | 2.53 | 24,330 | 31,625 | 16,445 | 4,381 | 21,177 | 42,484 | 36,111 |
| 8/1/2025 | 65 | 229 | 17,771 | 0.00 | 0 | 0 | 21,406 | 2,092 | 0 | 43,342 | 36,840 |
| 8/1/2026 | 66 | 0 | 0 | 0.00 | 0 | 0 | 0 | 0 | 0 | 0 | 0 |
| 8/1/2027 | 67 | 0 | 0 | 0.00 | 0 | 0 | 0 | 0 | 0 | 0 | 0 |

It is assumed the Joint Ownership Agreement is cancelled August 1, 2026 and the Employer's ownership interest is purchased.

THIS ILLUSTRATION IS CONSISTENT WITH THE PROPOSED SPLIT DOLLAR REGULATIONS ISSUED JULY 3, .

FIG. 31

Date Prepared: August 21,
\*\*\* EMPLOYEE BENEFIT ANALYSIS \*\*\*
® PROGRAM TESTING Page S-2

II - Flexible Premium Variable Life Form 86-01

Proposal Number: CHARLES
Proposal Date: August 1,
Initial Face Amount: 1,250,000.00

Employer: ABC Corporation
Owner: Charles Robertson
Insured: Charles Robertson
Class: Male, age 41, Non-Tobacco User

| Policy Year Beginning | Age At End Of Policy Year | Salary Bonus For Employee Premium Share | Salary Bonus For Buyout | Income Tax On Combined Bonus @35% | Accumulated Income Tax On Combined Bonus | Employee's Net Cash Outlay | Employee Share Percentage | Employee's Cash Surrender Value | Employee's Cash Withdrawal | Employee's Loan * | Employee's Net Policy Death Benefit | Employee's Cost Basis | Employee Equivalent Rate Of Return ** |
|---|---|---|---|---|---|---|---|---|---|---|---|---|---|
| 8/1/2003 | 42 | 6,696 | 0 | 2,344 | 2,344 | 2,344 | 37.20 | 3,767 | 0 | 0 | 465,000 | 6,696 | 128.13 |
| 8/1/2004 | 43 | 6,922 | 514 | 2,603 | 4,946 | 2,603 | 39.94 | 10,489 | 0 | 0 | 499,250 | 14,132 | 95.00 |
| 8/1/2005 | 44 | 7,415 | 873 | 2,936 | 7,882 | 2,936 | 42.68 | 18,591 | 0 | 0 | 533,500 | 22,520 | 67.67 |
| 8/1/2006 | 45 | 7,908 | 1,465 | 3,231 | 11,113 | 3,231 | 45.42 | 28,214 | 0 | 0 | 567,750 | 31,894 | 52.98 |
| 8/1/2006 | 46 | 8,401 | 1,997 | 3,640 | 14,802 | 3,640 | 48.16 | 39,626 | 0 | 0 | 602,000 | 42,293 | 44.07 |
| 8/1/2007 | 47 | 8,895 | 2,598 | 4,022 | 18,825 | 4,022 | 50.90 | 53,448 | 0 | 0 | 636,250 | 53,785 | 38.44 |
| 8/1/2008 | 48 | 9,388 | 3,248 | 4,423 | 23,247 | 4,423 | 53.64 | 69,528 | 0 | 0 | 670,500 | 66,421 | 34.31 |
| 8/1/2009 | 49 | 9,881 | 3,953 | 4,842 | 28,089 | 4,842 | 56.38 | 88,114 | 0 | 0 | 704,750 | 79,255 | 31.18 |
| 8/1/2010 | 50 | 10,374 | 4,716 | 5,282 | 33,371 | 5,282 | 59.12 | 109,480 | 0 | 0 | 739,000 | 95,345 | 28.72 |
| 8/1/2011 | 51 | 10,867 | 5,541 | 5,743 | 39,114 | 5,743 | 61.86 | 133,845 | 0 | 0 | 773,250 | 111,754 | 26.73 |
| 8/1/2012 | 52 | 11,360 | 6,445 | 6,232 | 45,346 | 6,232 | 64.60 | 162,083 | 0 | 0 | 807,500 | 129,559 | 25.13 |
| 8/1/2013 | 53 | 11,846 | 7,409 | 6,742 | 52,087 | 6,742 | 67.34 | 193,512 | 0 | 0 | 841,750 | 148,821 | 23.73 |
| 8/1/2014 | 54 | 12,346 | 8,452 | 7,277 | 59,367 | 7,277 | 70.08 | 229,040 | 0 | 0 | 876,000 | 169,620 | 22.53 |
| 8/1/2015 | 55 | 12,840 | 9,581 | 7,847 | 67,214 | 7,847 | 72.81 | 269,071 | 0 | 0 | 910,250 | 192,041 | 21.50 |
| 8/1/2016 | 56 | 13,333 | 10,804 | 8,448 | 75,662 | 8,448 | 75.55 | 314,158 | 0 | 0 | 944,375 | 216,177 | 20.62 |
| 8/1/2017 | 57 | 13,826 | 12,128 | 9,084 | 84,746 | 9,084 | 78.29 | 364,806 | 0 | 0 | 978,625 | 242,131 | 19.84 |
| 8/1/2018 | 58 | 14,319 | 13,564 | 9,759 | 94,505 | 9,759 | 81.03 | 421,638 | 0 | 0 | 1,012,875 | 270,014 | 19.15 |
| 8/1/2019 | 59 | 14,812 | 15,122 | 10,477 | 104,982 | 10,477 | 83.77 | 485,327 | 0 | 0 | 1,047,125 | 299,948 | 18.55 |
| 8/1/2020 | 60 | 15,305 | 16,813 | 11,241 | 116,241 | 11,241 | 86.51 | 556,640 | 0 | 0 | 1,081,375 | 332,066 | 18.00 |
| 8/1/2021 | 61 | 15,798 | 18,651 | 12,057 | 128,280 | 12,057 | 89.25 | 636,444 | 0 | 0 | 1,115,625 | 366,515 | 17.51 |
| 8/1/2022 | 62 | 16,291 | 20,650 | 12,929 | 141,210 | 12,929 | 91.99 | 725,752 | 0 | 0 | 1,149,875 | 403,456 | 17.09 |
| 8/1/2023 | 63 | 16,785 | 22,828 | 13,864 | 155,075 | 13,864 | 94.73 | 825,721 | 0 | 0 | 1,184,125 | 443,069 | 16.69 |
| 8/1/2024 | 64 | 17,278 | 25,204 | 14,869 | 169,944 | 14,869 | 97.47 | 937,690 | 0 | 0 | 1,218,375 | 485,553 | 16.34 |
| 8/1/2025 | 65 | 17,771 | 25,571 | 15,870 | 185,813 | 15,870 | 100.00 | 1,060,910 | 0 | 0 | 1,294,310 | 528,895 | 16.01 |

It is assumed the Joint Ownership Agreement is cancelled August 1, 2026 and the Employer's ownership interest is purchased.

| 8/1/2026 | 66 | 0 | 0 | 0 | 185,113 | 0 | 100.00 | 1,047,770 | 94,750 | 0 | 1,257,324 | 434,145 | 0.00 |
| 8/1/2027 | 67 | 0 | 0 | 0 | 185,113 | 0 | 100.00 | 1,033,369 | 94,750 | 0 | 1,229,395 | 339,395 | 0.00 |
| 8/1/2028 | 68 | 0 | 0 | 0 | 185,113 | 0 | 100.00 | 1,017,301 | 94,750 | 0 | 1,200,416 | 244,644 | 0.00 |
| 8/1/2029 | 69 | 0 | 0 | 0 | 185,113 | 0 | 100.00 | 999,722 | 94,750 | 0 | 1,197,675 | 149,894 | 0.00 |
| 8/1/2030 | 70 | 0 | 0 | 0 | 185,113 | 0 | 100.00 | 980,214 | 55,144 | 39,606 | 1,197,396 | 55,140 | 0.00 |
| 8/1/2031 | 71 | 0 | 0 | 0 | 185,113 | 0 | 100.00 | 959,249 | | | 1,151,416 | 0 | 0.00 |
| 8/1/2042 | 82 | 0 | 0 | 0 | 185,113 | 0 | 100.00 | 552,112 | 0 | 94,750 | 2,242,262 | 0 | 0.00 |
| 8/1/2043 | 83 | 0 | 0 | 0 | 185,113 | 0 | 100.00 | 489,314 | 0 | 94,750 | 2,385,534 | 0 | 0.00 |
| 8/1/2044 | 84 | 0 | 0 | 0 | 185,113 | 0 | 100.00 | 419,985 | 0 | 94,750 | 2,526,318 | 0 | 0.00 |
| 8/1/2045 | 85 | 0 | 0 | 0 | 185,113 | 0 | 100.00 | 355,202 | 0 | | 2,676,703 | 0 | 0.00 |
| 8/1/2046 | 86 | 0 | 0 | 0 | 185,113 | 0 | 100.00 | | 0 | | 2,834,875 | 0 | 0.00 |
| 8/1/2047 | 87 | 0 | 0 | 0 | 185,113 | 0 | 100.00 | 362,643 | 0 | 0 | 3,001,003 | 0 | 0.00 |
| 8/1/2048 | 88 | 0 | 0 | 0 | 185,113 | 0 | 100.00 | 382,942 | 0 | 0 | 3,175,251 | 0 | 0.00 |
| 8/1/2049 | 89 | 0 | 0 | 0 | 185,113 | 0 | 100.00 | 394,704 | 0 | 0 | 3,357,781 | 0 | 0.00 |
| 8/1/2050 | 90 | 0 | 0 | 0 | 185,113 | 0 | 100.00 | 404,454 | 0 | 0 | 3,549,715 | 0 | 0.00 |
| 8/1/2051 | 91 | 0 | 0 | 0 | 185,113 | 0 | 100.00 | 411,682 | 0 | 0 | 3,748,169 | 0 | 0.00 |
| 8/1/2052 | 92 | 0 | 0 | 0 | 185,113 | 0 | 100.00 | 422,134 | 0 | 0 | 3,925,133 | 0 | 0.00 |
| 8/1/2053 | 93 | 0 | 0 | 0 | 185,113 | 0 | 100.00 | 432,361 | 0 | 0 | 4,115,290 | 0 | 0.00 |
| 8/1/2054 | 94 | 0 | 0 | 0 | 185,113 | 0 | 100.00 | 459,365 | 0 | 0 | 4,320,946 | 0 | 0.00 |
| 8/1/2055 | 95 | 0 | 0 | 0 | 185,113 | 0 | 100.00 | 490,585 | 0 | 0 | 4,544,781 | 0 | 0.00 |

THIS ILLUSTRATION IS CONSISTENT WITH THE PROPOSED SPLIT DOLLAR REGULATIONS ISSUED JULY 3,

FIG. 32

Date Prepared: August 22,

\*\*\* EMPLOYER BENEFIT ANALYSIS \*\*\*
© PROGRAM TESTING

Page S- 1

Proposal Number: CHARLES #2
Proposal Date: August 1,
Initial Face Amount: 1,250,000.00

II - Flexible Premium Variable Life Form 86-01

Employer: ABC Corporation
Owner: Charles Robertson
Insured: Charles Robertson
Class: Male, age 41, Non-Tobacco User

| Policy Year Beginning | Age At End Of Policy Year | Premium Paid By Company | Premium Paid by Employee | Company Share Percentage | Company's Portion Of Surrender Value | Company's Death Benefit | Cost Basis Adjustment | Income From Buyout | Adjusted Cost Basis | Company's Salary Expense | Adjusted Company's Salary Expense | Company's Net Salary Expense |
|---|---|---|---|---|---|---|---|---|---|---|---|---|
| 8/1/ | 42 | 14,400 | 3,600 | 80.00 | 8,100 | 1,000,000 | 0 | 0 | 14,400 | 3,600 | 3,600 | 3,060 |
| 8/1/2003 | 43 | 14,112 | 3,888 | 76.51 | 20,093 | 956,375 | 968 | 0 | 27,544 | 4,542 | 4,542 | 3,861 |
| 8/1/2004 | 44 | 13,484 | 4,516 | 73.02 | 30,806 | 912,750 | 1,597 | 0 | 39,431 | 5,755 | 5,755 | 4,892 |
| 8/1/2005 | 45 | 12,856 | 5,144 | 69.53 | 43,191 | 869,125 | 2,225 | 0 | 50,062 | 7,011 | 7,011 | 5,959 |
| 8/1/2006 | 46 | 12,228 | 5,772 | 66.04 | 54,338 | 825,500 | 2,853 | 0 | 59,437 | 8,317 | 8,317 | 7,069 |
| 8/1/2007 | 47 | 11,600 | 6,400 | 62.55 | 65,681 | 781,875 | 3,481 | 0 | 67,555 | 9,710 | 9,710 | 8,253 |
| 8/1/2008 | 48 | 10,971 | 7,029 | 59.06 | 76,554 | 738,250 | 4,069 | 41 | 74,457 | 11,166 | 11,166 | 9,491 |
| 8/1/2009 | 49 | 10,343 | 7,657 | 55.57 | 86,848 | 694,625 | 4,458 | 288 | 80,342 | 12,692 | 12,692 | 10,788 |
| 8/1/2010 | 50 | 9,715 | 8,285 | 52.08 | 96,443 | 651,000 | 4,797 | 605 | 85,261 | 14,292 | 14,292 | 12,148 |
| 8/1/2011 | 51 | 9,087 | 8,913 | 48.59 | 105,133 | 607,375 | 5,106 | 976 | 89,242 | 15,971 | 15,971 | 13,576 |
| 8/1/2012 | 52 | 8,459 | 9,541 | 45.10 | 113,157 | 563,750 | 5,380 | 1,415 | 92,321 | 17,750 | 17,750 | 15,088 |
| 8/1/2013 | 53 | 7,831 | 10,169 | 41.61 | 119,573 | 520,125 | 5,662 | 1,888 | 94,490 | 19,606 | 19,606 | 16,665 |
| 8/1/2014 | 54 | 7,203 | 10,797 | 38.12 | 124,586 | 476,500 | 5,947 | 2,409 | 95,745 | 21,563 | 21,563 | 18,328 |
| 8/1/2015 | 55 | 6,575 | 11,425 | 34.64 | 128,013 | 433,000 | 6,255 | 2,974 | 96,064 | 23,629 | 23,629 | 20,085 |
| 8/1/2016 | 56 | 5,946 | 12,054 | 31.15 | 129,530 | 389,375 | 6,612 | 3,575 | 95,399 | 25,815 | 25,815 | 21,942 |
| 8/1/2017 | 57 | 5,318 | 12,682 | 27.66 | 128,887 | 345,750 | 7,050 | 4,199 | 93,667 | 28,130 | 28,130 | 23,910 |
| 8/1/2018 | 58 | 4,690 | 13,310 | 24.17 | 125,768 | 302,125 | 7,616 | 4,830 | 90,741 | 30,587 | 30,587 | 25,999 |
| 8/1/2019 | 59 | 4,062 | 13,938 | 20.68 | 119,811 | 258,500 | 8,375 | 5,443 | 86,428 | 33,199 | 33,199 | 28,219 |
| 8/1/2020 | 60 | 3,434 | 14,566 | 17.19 | 110,607 | 214,875 | 9,417 | 5,999 | 80,445 | 35,981 | 35,981 | 30,584 |
| 8/1/2021 | 61 | 2,806 | 15,194 | 13.70 | 97,695 | 171,250 | 10,879 | 6,438 | 72,372 | 38,950 | 38,950 | 33,107 |
| 8/1/2022 | 62 | 2,178 | 15,822 | 10.21 | 80,551 | 127,625 | 12,975 | 6,663 | 61,574 | 42,124 | 42,124 | 35,806 |
| 8/1/2023 | 63 | 1,550 | 16,450 | 6.72 | 58,575 | 84,000 | 16,075 | 6,501 | 47,049 | 45,527 | 45,527 | 38,698 |
| 8/1/2024 | 64 | 921 | 17,079 | 3.23 | 31,074 | 40,375 | 20,185 | 5,584 | 27,030 | 49,185 | 49,185 | 41,807 |
| 8/1/2025 | 65 | 293 | 17,707 | 0.00 | 0 | 0 | 27,326 | 2,675 | 0 | 50,359 | 50,359 | 42,805 |
| 8/1/2026 | 66 | 0 | 0 | 0.00 | 0 | 0 | 0 | 0 | 0 | 0 | 0 | 0 |
| 8/1/2027 | 67 | 0 | 0 | 0.00 | 0 | 0 | 0 | 0 | 0 | 0 | 0 | 0 |

It is assumed the Joint Ownership Agreement is cancelled August 1, 2026 and the Employer's ownership interest is purchased.

FIG. 33

Date Prepared: August 22,

\*\*\* EMPLOYEE BENEFIT ANALYSIS \*\*\*
© PROGRAM TESTING

Page S- 2

II - Flexible Premium Variable Life Form 86-01

Proposal Number: CHARLES #2
Proposal Date: August 1,
Initial Face Amount: 1,250,000.00

Employer: ABC Corporation
Owner: Charles Robertson
Insured: Charles Robertson
Class: Male, age 41, Non-Tobacco User

| Policy Year Beginning | Age At End Of Policy Year | Salary Bonus For Employee Premium Share | Salary Bonus For Buyout | Income Tax On Bonus @35% | Accumulated Income Tax On Combined Bonus | Employee's Net Cash Outlay | Employee Share Percentage | Employee's Cash Surrender Value | Employee's Cash Withdrawal | Employee's Loan | Employee's Net Policy Death Benefit | Employee's Cost Basis | Employee's Equivalent Rate Of Return |
|---|---|---|---|---|---|---|---|---|---|---|---|---|---|
| 8/1/2003 | 42 | 3,600 | 0 | 1,260 | 1,260 | 1,260 | 20.00 | 2,025 | 0 | 0 | 250,000 | 3,600 | 128.13 |
| 8/1/2004 | 43 | 3,888 | 655 | 1,590 | 2,850 | 1,590 | 23.49 | 16,169 | 0 | 0 | 293,625 | 8,142 | 101.88 |
| 8/1/2005 | 44 | 3,516 | 1,239 | 2,014 | 4,864 | 2,014 | 26.97 | 18,328 | 0 | 0 | 337,875 | 13,898 | 74.07 |
| 8/1/2006 | 45 | 4,144 | 1,867 | 2,454 | 7,318 | 2,454 | 30.47 | 22,942 | 0 | 0 | 380,875 | 20,909 | 58.29 |
| 8/1/2006 | 46 | 5,772 | 2,544 | 2,911 | 10,229 | 2,911 | 33.96 | 27,500 | 0 | 0 | 424,500 | 29,225 | 48.69 |
| 8/1/2007 | 47 | 6,400 | 3,309 | 3,398 | 13,627 | 3,398 | 37.45 | 39,325 | 0 | 0 | 468,125 | 38,935 | 42.50 |
| 8/1/2008 | 48 | 7,029 | 3,938 | 3,977 | 17,355 | 3,977 | 40.94 | 53,066 | 0 | 0 | 511,750 | 50,101 | 37.90 |
| 8/1/2009 | 49 | 7,657 | 4,035 | 4,402 | 21,977 | 4,402 | 44.43 | 69,438 | 0 | 0 | 555,375 | 62,792 | 34.31 |
| 8/1/2010 | 50 | 8,285 | 5,007 | 4,922 | 26,899 | 4,922 | 47.92 | 88,739 | 0 | 0 | 599,000 | 77,084 | 31.54 |
| 8/1/2011 | 51 | 8,913 | 7,058 | 5,590 | 32,569 | 5,590 | 51.41 | 111,234 | 0 | 0 | 642,625 | 93,055 | 29.26 |
| 8/1/2012 | 52 | 9,541 | 8,209 | 6,213 | 38,782 | 6,213 | 54.90 | 137,746 | 0 | 0 | 686,250 | 110,806 | 27.43 |
| 8/1/2013 | 53 | 10,169 | 9,436 | 6,862 | 45,644 | 6,862 | 58.39 | 167,792 | 0 | 0 | 729,875 | 130,412 | 25.83 |
| 8/1/2014 | 54 | 10,797 | 10,766 | 7,547 | 53,191 | 7,547 | 61.88 | 202,240 | 0 | 0 | 773,500 | 151,975 | 24.45 |
| 8/1/2015 | 55 | 11,425 | 11,261 | 8,270 | 61,461 | 8,270 | 65.85 | 241,539 | 0 | 0 | 817,000 | 175,604 | 23.24 |
| 8/1/2016 | 56 | 12,054 | 12,704 | 9,035 | 70,497 | 9,035 | 68.85 | 286,297 | 0 | 0 | 860,625 | 201,419 | 22.24 |
| 8/1/2017 | 57 | 13,682 | 15,448 | 9,845 | 80,342 | 9,845 | 72.34 | 337,081 | 0 | 0 | 904,250 | 229,548 | 21.36 |
| 8/1/2018 | 58 | 13,938 | 17,261 | 10,705 | 91,047 | 10,705 | 75.83 | 394,580 | 0 | 0 | 947,875 | 263,135 | 20.56 |
| 8/1/2019 | 59 | 14,566 | 19,261 | 11,620 | 102,667 | 11,620 | 79.32 | 459,545 | 0 | 0 | 991,500 | 293,334 | 19.86 |
| 8/1/2020 | 60 | 15,194 | 21,415 | 12,593 | 115,260 | 12,593 | 82.81 | 532,833 | 0 | 0 | 1,035,125 | 329,316 | 19.23 |
| 8/1/2021 | 61 | 15,194 | 23,756 | 13,632 | 128,893 | 13,632 | 86.30 | 615,407 | 0 | 0 | 1,078,750 | 368,265 | 18.67 |
| 8/1/2022 | 62 | 15,822 | 26,304 | 14,743 | 143,636 | 14,743 | 89.79 | 708,395 | 0 | 0 | 1,122,375 | 410,390 | 18.18 |
| 8/1/2023 | 63 | 16,450 | 29,077 | 15,935 | 159,571 | 15,935 | 93.28 | 813,082 | 0 | 0 | 1,166,000 | 455,917 | 17.71 |
| 8/1/2024 | 64 | 17,077 | 32,106 | 17,215 | 176,785 | 17,215 | 96.77 | 930,956 | 0 | 0 | 1,209,625 | 505,101 | 17.30 |
| 8/1/2025 | 65 | 17,707 | 32,652 | 17,626 | 194,411 | 17,626 | 100.00 | 1,060,910 | 0 | 0 | 1,294,310 | 555,460 | 16.93 |

It is assumed the Joint Ownership Agreement is cancelled August 1, 2026 and the Employer's ownership interest is purchased.

| 8/1/2026 | 66 | 0 | 0 | 0 | 194,411 | 0 | 100.00 | 1,048,112 | 94,433 | 0 | 1,257,735 | 461,027 | 0.00 |
| 8/1/2027 | 67 | 0 | 0 | 0 | 194,411 | 0 | 100.00 | 1,034,083 | 94,433 | 0 | 1,230,559 | 366,593 | 0.00 |
| 8/1/2028 | 68 | 0 | 0 | 0 | 194,411 | 0 | 100.00 | 1,018,417 | 94,433 | 0 | 1,201,733 | 272,160 | 0.00 |
| 8/1/2029 | 69 | 0 | 0 | 0 | 194,411 | 0 | 100.00 | 1,001,274 | 94,433 | 0 | 1,171,491 | 177,727 | 0.00 |
| 8/1/2030 | 70 | 0 | 0 | 0 | 194,411 | 0 | 100.00 | 982,539 | 83,293 | 0 | 1,139,745 | 83,293 | 0.00 |
| 8/1/2031 | 71 | 0 | 0 | 0 | 194,411 | 0 | 100.00 | 962,005 | 0 | 11,140 | 1,119,886 | 0 | 0.00 |
| 8/1/2042 | 82 | 0 | 0 | 0 | 194,411 | 0 | 100.00 | 566,255 | 0 | 94,433 | 2,191,690 | 0 | 0.00 |
| 8/1/2043 | 83 | 0 | 0 | 0 | 194,411 | 0 | 100.00 | 505,188 | 0 | 94,433 | 2,328,498 | 0 | 0.00 |
| 8/1/2044 | 84 | 0 | 0 | 0 | 194,411 | 0 | 100.00 | 437,168 | 0 | 94,433 | 2,470,443 | 0 | 0.00 |
| 8/1/2045 | 85 | 0 | 0 | 0 | 194,411 | 0 | 100.00 | 360,576 | 0 | 94,433 | 2,618,313 | 0 | 0.00 |
| 8/1/2046 | 86 | 0 | 0 | 0 | 194,411 | 0 | 100.00 | 378,221 | 0 | 0 | 2,773,693 | 0 | 0.00 |
| 8/1/2047 | 87 | 0 | 0 | 0 | 194,411 | 0 | 100.00 | 395,369 | 0 | 0 | 2,936,962 | 0 | 0.00 |
| 8/1/2048 | 88 | 0 | 0 | 0 | 194,411 | 0 | 100.00 | 411,690 | 0 | 0 | 3,108,292 | 0 | 0.00 |
| 8/1/2049 | 89 | 0 | 0 | 0 | 194,411 | 0 | 100.00 | 426,820 | 0 | 0 | 3,287,854 | 0 | 0.00 |
| 8/1/2050 | 90 | 0 | 0 | 0 | 194,411 | 0 | 100.00 | 440,327 | 0 | 0 | 3,475,781 | 0 | 0.00 |
| 8/1/2051 | 91 | 0 | 0 | 0 | 194,411 | 0 | 100.00 | 451,738 | 0 | 0 | 3,672,201 | 0 | 0.00 |
| 8/1/2052 | 92 | 0 | 0 | 0 | 194,411 | 0 | 100.00 | 466,720 | 0 | 0 | 3,846,739 | 0 | 0.00 |
| 8/1/2053 | 93 | 0 | 0 | 0 | 194,411 | 0 | 100.00 | 486,833 | 0 | 0 | 4,034,365 | 0 | 0.00 |
| 8/1/2054 | 94 | 0 | 0 | 0 | 194,411 | 0 | 100.00 | 514,085 | 0 | 0 | 4,237,355 | 0 | 0.00 |
| 8/1/2055 | 95 | 0 | 0 | 0 | 194,411 | 0 | 100.00 | 550,918 | 0 | 0 | 4,458,362 | 0 | 0.00 |

FIG. 34

```
Date Prepared: August 22,                    @ PROGRAM TESTING                                              Page A-1
MSWESTB, LCPC19S2  RMACON, LCPC19S2  6:24 PM                  Group: VARY41       Proposal Number: CHARLES #3

Proposal Date:                              2
Specified Face Amount:       1,250,000.00   II Agent:      Affiliate Insured:  Charles Robertson    Male Non-Tobacco User Age 41
Owner:    Charles Robertson    Tax Rate: 35.00
Employer: ABC Corporation      Tax rate: 15.00
Employee: Charles Robertson Prepared for presentation in North Carolina
The initial premium split is 50% from the employee and 50% from the employer
Calculate additional premium share beginning in year 2 for a maximum employer ownership interest of $0.00, calculated +.1817% monthly
End joint ownership after age 65 or when the employer's ownership interest returns to zero
Bonus employee for premium share cost
Endorsement Pay premium through age 65

Calc.  Prem.  Premium/
        Option Mode   Cash Value
Age      1      M     1,500.00
41

Effective         Policy         Coverage      Employee/ E/ DB Prem Table Flat              Guideline Premiums
  Date   Seg. Yr. Mo Age          Amount       Employer  R  Opt Cat Rating Rating Mos.   Level           Single
   1      1   1   1  41        1,250,000.00    0.00 R    I  NTU    0     0.00/Y    0    18,044.60      216,426.95

Withdrawal/Loan Schedule
Beginning at age 65      94,971.79   Annual withdrawal through age 85 (calculated maximum leaving $50,000.00 at age 95),
                                     THE TARGET CASH VALUE WAS EXCEEDED TO PROVIDE THE FULL WITHDRAWAL/LOAN AMOUNT FOR THE DURATION REQUESTED
Beginning 8/01/2031                  Switch to loans, interest will accumulate Guaranteed Interest:  4.5% (General Account only)
Assumed Interest:    10%  (8.3% Net)

Guideline Level Premium              1,503.71 Monthly         18,044.60 Annually
Guideline Single Premium           216,426.95 Monthly
Target Premium                         966.67 Monthly         11,600.00 Annually
Minimum First Month Premium            806.94
Initial 7 pay premium                4,208.07 Monthly         50,496.74 Annually

THIS ILLUSTRATION IS FOR AGENT USE ONLY, NO COMPLIANT SECTION IS PRESENT
```

FIG. 35

Date Prepared: August 22,  \*\*\* EMPLOYER BENEFIT ANALYSIS \*\*\*  Page S- 1
© PROGRAM TESTING II - Flexible Premium Variable Life Form 86-01

Proposal Number: CHARLES #3  Employer: ABC Corporation
Proposal Date: August 1,  Owner: Charles Robertson
Initial Face Amount: 1,250,000.00  Insured: Charles Robertson
Class: Male, age 41, Non-Tobacco User

| Policy Year Beginning | Age At End Of Policy Year | Premium Paid By Company | Premium Paid by Employee | Company Share Percentage | Company's Portion Of Surrender Value | Company's Death Benefit | Cost Basis Adjustment | Income From Buyout | Adjusted Cost Basis | Company's Salary Expense | Company's Net Salary Expense |
|---|---|---|---|---|---|---|---|---|---|---|---|
| 8/1/2003 | 42 | 9,000 | 9,000 | 50.00 | 5,063 | 625,000 | 0 | 0 | 9,000 | 9,000 | 7,650 |
| 8/1/2004 | 43 | 8,820 | 9,180 | 47.82 | 12,559 | 597,750 | 605 | 0 | 17,215 | 9,589 | 8,150 |
| 8/1/2005 | 44 | 8,428 | 9,572 | 45.64 | 19,880 | 570,500 | 997 | 0 | 24,645 | 10,347 | 8,795 |
| 8/1/2006 | 45 | 8,035 | 9,965 | 43.46 | 26,997 | 543,250 | 1,390 | 0 | 31,291 | 11,131 | 9,461 |
| 8/1/2006 | 46 | 7,643 | 10,357 | 41.28 | 33,965 | 516,000 | 1,782 | 0 | 37,151 | 11,947 | 10,155 |
| 8/1/2007 | 47 | 7,250 | 10,750 | 39.10 | 41,057 | 488,750 | 2,175 | 0 | 42,227 | 12,817 | 10,894 |
| 8/1/2008 | 48 | 6,858 | 11,142 | 36.92 | 47,856 | 461,500 | 2,542 | 25 | 46,543 | 13,727 | 11,668 |
| 8/1/2009 | 49 | 6,465 | 11,535 | 34.74 | 54,294 | 434,250 | 2,785 | 180 | 50,223 | 14,680 | 12,478 |
| 8/1/2010 | 50 | 6,073 | 11,927 | 32.56 | 60,295 | 407,000 | 2,997 | 378 | 53,299 | 15,679 | 13,328 |
| 8/1/2011 | 51 | 5,680 | 12,320 | 30.38 | 65,732 | 379,750 | 3,190 | 610 | 55,790 | 16,729 | 14,219 |
| 8/1/2012 | 52 | 5,288 | 12,712 | 28.20 | 70,755 | 352,500 | 3,361 | 883 | 57,716 | 17,840 | 15,164 |
| 8/1/2013 | 53 | 4,895 | 13,105 | 26.02 | 74,772 | 325,250 | 3,537 | 1,179 | 59,074 | 18,999 | 16,150 |
| 8/1/2014 | 54 | 4,503 | 13,497 | 23.84 | 77,915 | 298,000 | 3,715 | 1,505 | 59,862 | 20,222 | 17,188 |
| 8/1/2015 | 55 | 4,110 | 13,890 | 21.65 | 80,008 | 270,625 | 3,908 | 1,857 | 60,065 | 21,512 | 18,286 |
| 8/1/2016 | 56 | 3,718 | 14,282 | 19.47 | 80,962 | 243,375 | 4,130 | 2,233 | 59,652 | 22,878 | 19,446 |
| 8/1/2017 | 57 | 3,326 | 14,674 | 17.29 | 80,566 | 216,125 | 4,404 | 2,623 | 58,573 | 24,324 | 20,675 |
| 8/1/2018 | 58 | 2,933 | 15,067 | 15.11 | 78,625 | 188,875 | 4,758 | 3,017 | 56,749 | 25,859 | 21,980 |
| 8/1/2019 | 59 | 2,541 | 15,459 | 12.93 | 74,911 | 161,625 | 5,231 | 3,400 | 54,059 | 27,491 | 23,367 |
| 8/1/2020 | 60 | 2,148 | 15,852 | 10.75 | 69,170 | 134,375 | 5,881 | 3,748 | 50,325 | 29,229 | 24,844 |
| 8/1/2021 | 61 | 1,756 | 16,244 | 8.57 | 61,113 | 107,125 | 6,794 | 4,023 | 45,287 | 31,083 | 26,421 |
| 8/1/2022 | 62 | 1,363 | 16,637 | 6.39 | 50,414 | 79,875 | 8,101 | 4,164 | 38,549 | 33,066 | 28,106 |
| 8/1/2023 | 63 | 971 | 17,029 | 4.21 | 36,697 | 52,625 | 10,035 | 4,064 | 29,485 | 35,192 | 29,913 |
| 8/1/2024 | 64 | 578 | 17,422 | 2.03 | 19,529 | 25,375 | 13,066 | 3,494 | 16,997 | 37,477 | 31,855 |
| 8/1/2025 | 65 | 186 | 17,814 | 0.00 | 0 | 0 | 17,183 | 1,688 | 0 | 38,356 | 32,603 |
| 8/1/2026 | 66 | 0 | 0 | 0.00 | 0 | 0 | 0 | 0 | 0 | 0 | 0 |
| 8/1/2027 | 67 | 0 | 0 | 0.00 | 0 | 0 | 0 | 0 | 0 | 0 | 0 |

It is assumed the Joint Ownership Agreement is cancelled August 1, 2026 and the Employer's ownership interest is purchased.

FIG. 36

SYSTEM AND METHODS FOR TRACKING THE RELATIVE INTERESTS OF THE PARTIES TO AN INSURANCE POLICY

FIELD OF THE INVENTION

The present invention relates to life insurance, and particularly, to systems and processes for proposing, tracking, and converting split-dollar and jointly-owned life insurance policies.

BACKGROUND OF THE INVENTION

Split-dollar funding arrangements have been used for many years. Oftentimes, the purpose of a split-dollar arrangement is to reduce the cost to an individual for insuring the individual's life. The cost to the individual is reduced by splitting the premiums paid for the life insurance with a sponsoring individual or entity, such as the individual's employer. An equity split-dollar arrangement is generally secured by a written agreement that provides for the sharing of premiums in exchange for the sharing of the death benefit and cash value that may be realized from the policy. As one of many advantages, split-dollar arrangements can be structured in many different ways to achieve the objectives of the parties to an insurance contract.

Recent legislation may impact the ability of parties to enter into split-dollar arrangements. In particular, the Sarbanes-Oxley Act of 2002 makes it unlawful for an issuer of securities, directly or indirectly, to extend or maintain credit, to arrange for the extension of credit, or to renew an extension of credit, in the form of a personal loan, to or for any director or executive officer (or equivalent thereof) of that issuer. Any loan in existence on Jul. 30, 2002, is exempted from the reach of this prohibition, so long as there is no material modification to any term of the loan or any renewal of such loan on or after that date.

Moreover, according to proposed regulations regarding the taxation of equity split-dollar life insurance arrangements, one type of split-dollar arrangement—collateral assignment, is essentially a below market loan from the sponsor to the insured, while another type of equity split-dollar arrangement—endorsement, is not. One key to the distinction is the ownership of the split-dollar policy. In a collateral assignment type arrangement, the insured owns the life insurance policy and assigns benefits to the sponsor in exchange for premiums paid by the sponsor. In contrast, the sponsor owns the life insurance policy in an endorsement split-dollar arrangement. The distinction is important due at least in part to the federal tax treatment of the respective types of arrangements.

Prior to the issuance of the proposed regulations, IRS regulations did not differentiate between endorsement and collateral assignment split-dollar arrangements. All economic benefits provided by the sponsor under split-dollar arrangements were taxed as compensation to the insured. The insured was taxed on the annual cost of the life insurance (less any premiums paid by the insured), and also on any distributions or other economic benefits provided to the insured by virtue of the split-dollar arrangement.

Under the proposed regulations, ownership of a life insurance policy is determined as follows. The owner of a life insurance policy is generally the entity named as the policy owner. If more than one entity is named as the policy owner, then the first entity listed is the owner, unless each entity has an undivided interest in the rights and benefits of the life insurance policy. If each entity owns an undivided interest, then each listed policy owner is deemed to own a separate life insurance policy (and neither policy is considered to be a split-dollar policy).

The proposed regulations require both the owner and the non-owner of the life insurance contract to provide comprehensive and consistent accounting under any type of split-dollar arrangement. More specifically, the parties to the life insurance policy must account for:

premiums paid by owner and by the non-owner of the life insurance policy (although premiums paid for a split-dollar life insurance policy are not tax deductible by either the insured or the sponsor);

the value of the economic benefit conferred on the insured by the sponsor's payment of premiums on the insured's behalf;

the value of any interest in the cash surrender value (CSV) of the policy that is provided to the non-owner during the taxable year;

distributions (other than death benefits) made from the policy to the owner and/or the non-owner;

payments or other consideration given to the sponsor by the insured in exchange for the sponsor's payment of premiums on the insured's behalf; and reimbursements for premiums or taxes paid, which is treated as taxable income to the payee and as a deductible business expense by the payor.

The new regulations have created a need for insurance companies and the parties to track the relative interests of the parties throughout the term of an equity split-dollar insurance policy. Comprehensive accounting is necessary for compliance with the regulations, and can aid in structuring split-dollar arrangements so as to minimize the tax consequences and maximize economic benefits to both owners or parties.

The new regulations also create the need for innovative insurance products that continue to provide the benefits of split-dollar funding, while minimizing the regulatory and tax consequences to the participating entities.

SUMMARY OF THE INVENTION

Various embodiments of the present invention address the needs discussed above with systems and processes for comprehensively and consistently projecting, tracking and assessing the performance of one or more life insurance policies, and the relative interests of entities that are parties to each life insurance policy. Generally, various embodiments of the inventions utilize certain input data regarding actual and potential parties to an insurance contract, regulatory considerations, as well as the objectives that the parties intend to achieve, to propose, create, track, maintain, and implement an insurance policy or a group insurance plan. Certain embodiments of the invention can also convert the structure and function of existing insurance policies.

An aspect of various embodiments of the invention involves systems and processes for creating an arrangement that allows entities to cooperatively fund an insurance policy. To create or propose the creation of such a policy, basic information must be collected. Certain embodiments of the present invention provide an enterprise platform that receives a number of input parameters regarding at least one of the entities, and calculates the terms for the life insurance policy. Examples of input parameters include: age of the entity; gender of the entity; tax rate of the entity; term of policy; desired premium for the entity; desired cash value for the entity; and death benefit desired for the entity. At least some of the input parameters can be provided as a discrete value, or as a schedule of values distributed over a given period of time, such as the duration of the policy. Input parameters may be provided over a computer network by a user accessing the enterprise platform via user interface, such as a web browser. Input parameters can also be stored and retrieved from an enterprise database or other storage element that is accessible via the enterprise platform. The enterprise platform processes the input data to produce output parameters to define, communicate, monitor, and implement the terms of the insurance policy. The algorithms applied are determined by the input parameters supplied and the output parameters desired. Examples of output parameters include equity interest of the entity in the policy; interest of the entity in death benefit of said policy; premiums due from the entity; and estimated tax consequences for the entity. Output parameters can describe the performance of an insurance policy at a particular point in time, upon the occurrence of an event, or over a period of time.

Another aspect of certain embodiments of the invention involves systems and processes for servicing existing insurance policies, such as by monitoring, assessing, and addressing the performance of the policies. Thus, policy servicing includes periodic and event triggered policy reevaluations, re-proposal, and reporting functions. Initial and/or ongoing policy objectives are established, such as a target cash value, death benefit, tax liability, premium payment, respective contributions, liabilities, and equity shares of the parties of the insurance policy. Policies that fail to achieve one or more policy objectives may be designated as "non-conforming." Systems and processes for tracking the performance of the policies relative to these objectives provide reports, and invoke reevaluation or re-proposal triggers to address non-conforming insurance policies. Furthermore, in certain embodiments, regulatory changes or the availability of more favorable policy structures can trigger reevaluation and/or re-proposal of existing insurance policies. Transactions are also tracked and posted to confirm that the policies are executed according to the terms.

The systems and processes of various embodiments of the invention also utilize the enterprise platform to report at least annually, for each entity or group of entities, output parameters that summarize the performance of the policy. Output parameters are formatted so as to maximize the practical utility of the information, such as by generating accounting memoranda, fiscal year end reports, and entity equity reports.

Yet another aspect of certain embodiments of the invention includes systems and processes for converting the structure and function of existing insurance policies. For example, existing split-dollar policies can be converted to joint ownership policies. Policy conversions may occur in response to requests received from users of the systems and processes of various embodiments of the invention, or can be triggered automatically in response to a conversion trigger, such as a policy recalculation or the acceptance of a policy re-proposal.

In certain embodiments, the arrangement is a jointly-owned insurance policy that is not subject to the proposed regulations directed to split-dollar products. The jointly-owned insurance policy requires at least two entities to share an undivided interest in a single policy, although the equity shares of each entity may differ. Additional input parameters that may be supplied to create a joint ownership arrangement include the desired initial equity share of the entity; the desired terminal equity of the entity; and desired annual equity transfers between entities. The terms defined by the enterprise platform establish each entity as a co-owner of the policy, and establish a schedule for the disposition of the respective equity shares of the entities according to the desired initial and terminal equity shares of the entities, and to the term of the policy. The disposition schedule determines the timing of transfers of funds between entities and regulatory agencies according to the terms of the policy, subject to the interim objectives of the entities such as any provision for deferring transfers during a specified portion of the policy term.

In certain other embodiments of the invention, the arrangement may include a split-dollar insurance policy. Additional input parameters that may be supplied to create a split-dollar arrangement include: incremental death benefit ratios; and incremental cash value ratios. Output parameters may include loan repayment amounts; reimbursements for loan repayments; reimbursements for interest payments; tax liability incurred; reimbursements for tax payments.

In certain other embodiments of the invention, the arrangement may include an employer-owned insurance policy. Output parameters specific to an employer-owned insurance policy relate at least in part to objective of offsetting the economic benefit received by virtue of the employer's premium payments on an employee's behalf, such as: employee basis; and employee contribution required to offset economic benefit.

Thus, various aspects of the systems and processes of the embodiments of the present invention propose, create, evaluate, track, report, and implement insurance policies to provide compliance with regulatory requirements, to optimize achievement of policy objectives, to minimize tax consequences, and facilitate administration. Other objects, features, and advantages will be apparent from other portions of this document.

BRIEF DESCRIPTION OF THE DRAWINGS

FIG. 2-FIG. 16 are various interfaces presented by various entities according to certain aspects and embodiments of the invention.

FIGS. 17-36 are various reports delivered by the presentation functionality according to certain aspects and embodiments of the invention.

DETAILED DESCRIPTION

Figure 1:
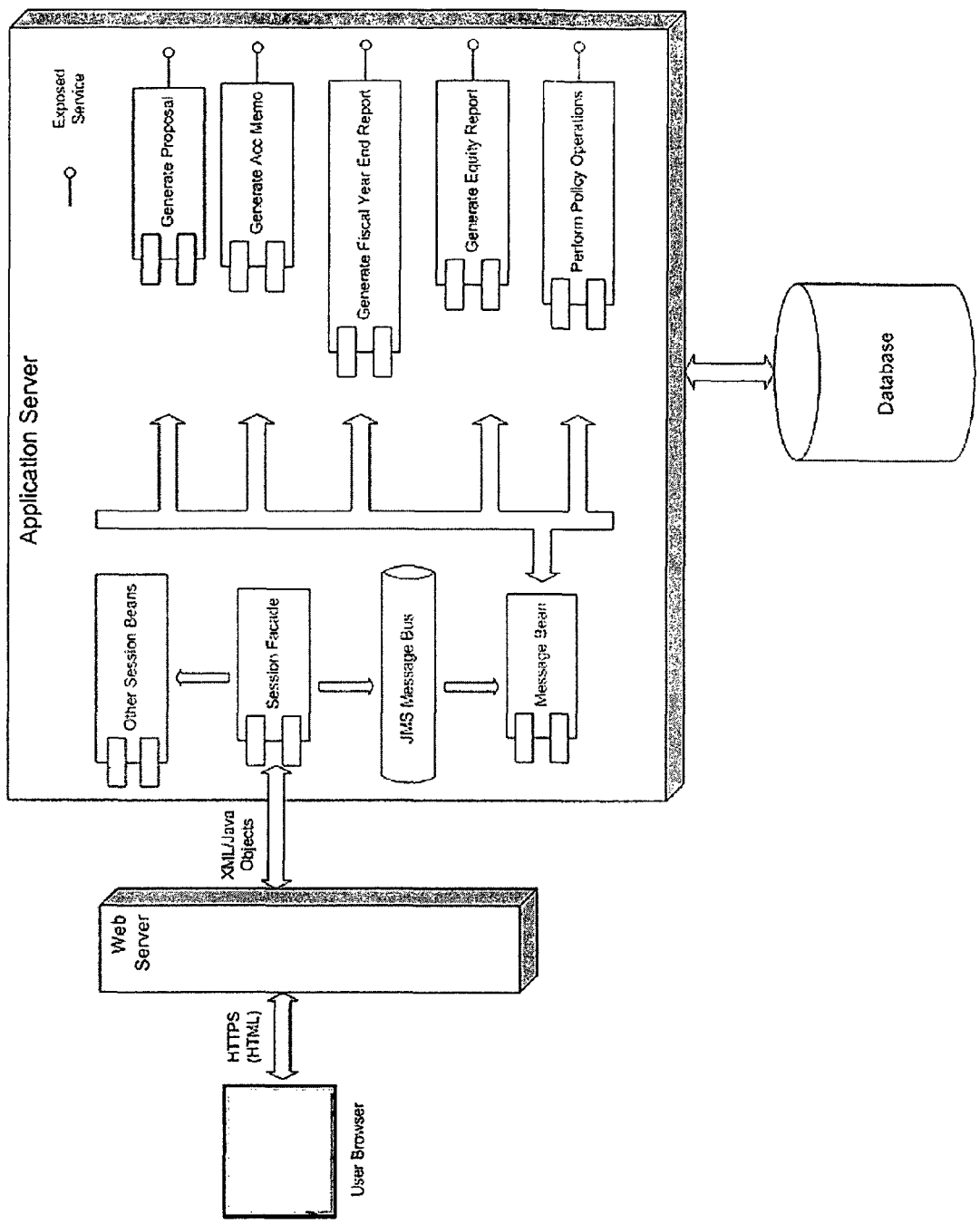
FIG. 1 is a functional diagram of a system according to certain embodiments of the invention.

Reference will now be made in detail to certain aspects of the invention, non-limiting examples of which are illustrated in the accompanying drawings. Potential users of systems and processes according to various embodiments of the invention may include an insurance administrator, an insurance affiliate, and/or an individual who is at least potentially a party to an insurance contract.

An insurance "administrator" administers insurance services and products on behalf of an insurance company, or on behalf of a bulk purchaser of insurance services and products, such as a corporate benefits administrator.

An insurance "affiliate" may include an entity that is separate from the insurance provider, but sells or otherwise manages insurance products on behalf of an insurance provider.

The user can interact with a provider of insurance policies that implements systems and processes according to various embodiments of the invention via a computer network, such as the Internet. The user interacts with the provider by exchanging information with host system hosted by the insurance provider, which can be implemented using any desired hardware platforms, databases, software, applets, formats, and standardized protocols. According to an aspect of the various embodiments of the invention, the host system includes applications that administer insurance policies so as to maximize resultant cash flow, ensure compliance with applicable regulations, and minimize tax consequences.

The host system utilizes data and resources to perform a number of insurance related functions over the computer network, and generates dynamic information for presentation to the user via various interfaces. For instance, the host system processes the information provided by the user along with data resident on a host database, to perform proposal and policy operations and to generate reports.

Policy Operations

Policy operations manipulate data stored in the host database. Policy operations may involve creation, amendment, maintenance, tracking, reporting, evaluation, and termination of insurance policies. Examples of policy operations include:
- defining the layout and content of onscreen and/or printed versions of policies;
- capturing policy input information;
- adjusting the accounting history of a particular policy;
- monitoring the performance of existing "inforce" policies;
- reevaluating inforce policies;
- establishing reevaluation defaults;
- initiating a new re-proposal or updating inforce policies based upon the results of a policy reevaluation;
- updating inforce policies based upon a party's acceptance of a re-proposal;
- establishing default values for policy input information;
- tracking the receipt of premiums and other fees;
- printing reports and lists; and
- linking entities to policies.

Tracking applications retrieve and process data regarding particular policies to produce reports that can be directed to a plan sponsor or to the financial representative of a plan sponsor. In addition to report generation, policy tracking involves monitoring the results of existing policies to determine whether structural or financial changes are required to optimize achievement of policy goals. For instance, in one embodiment, an insurance policy or group of policies (an "insurance plan") is reevaluated each year to determine the long-term effects of the regulatory, economic, or financial environment to which the policy is exposed. The reevaluation enables the systems of various embodiments of the invention, preferably in concert with the administrator and/or the parties to the policy, to optimize the achievement of policy objectives. The reevaluation may trigger the generation of a re-proposal that describes the changes needed to improve the performance of the policy.

A report is generated when a user manually requests information in a particular format, or when a report application automatically requests a report. Reports may be automatically requested according to a schedule (e.g., monthly, quarterly, or annually). Alternatively, a report application may be programmed to request and/or distribute a report in response to a particular event or occurrence. Information included in reports generated may include:
- policy/proposal transactions;
- entity information;
- periodic accounting memoranda;
- policy/proposal/entity status;
- missing accounting data;
- premium history;
- policy value history;
- entity equity in a particular policy or group of policies; and
- fee transactions.

Proposal Operations

A proposal is generated in response to a proposal triggering event, which typically involves a user inquiry about initiating a new insurance policy or changing an inforce policy. Proposals may also be triggered in response to changes in regulatory requirements, or to the results of a policy reevaluation. Proposal operations performed by the host system may include:
- defining the layout and content of onscreen and/or printed proposals;
- selecting policy distribution options;
- capturing proposal input information, according to the type of policy to be proposed;
- establishing default values for proposal input information;
- managing previously generated or partially developed proposals;
- revising existing proposals;
- converting a previously generated proposal to an insurance policy;
- initiating automatic recalculation of selected proposals, according to business rules implemented by insurance provider, or according to regulatory requirements;
- generating reports summarizing the content of one or more proposals;
- searching and indexing proposals by various parameters, including by affiliate, insured, beneficiary, sponsor, status, cash value, and death benefit;
- capturing, implementing, and displaying regulatory guidelines, such as those resulting from the Deficit Reduction Act of 1984 (DEFRA) or from the Sarbanes-Oxley Act of 2002;
- associating proposals according to membership in a group;
- performing batch proposal operations on the members of a particular group; and
- capturing proposal transactions.

Exemplary Environment

FIG. 1 is a functional diagram that shows the relative functions of the components of certain embodiments of the systems and processes of the invention. In certain embodiments, the computer network is the Internet. The host processor is at least a component of an enterprise platform 100, such as the WebLogic® Server 7.0 application server. The enterprise platform 100 preferably supports at least a three-tiered architecture, including a presentation layer, a business layer, and a back-end layer.

The presentation layer of the enterprise platform manages the user's ability to interface with enterprise applications using a desktop application, and/or preferably a web browser 105. Access to particular applications is controlled by assigning various roles to users according to the type of user. Preferably, the user accesses the enterprise platform via a web server 110, using a secure server protocol that facilitates the transfer of sensitive policy related information, such as social security numbers, income, and health status. HTTPS (hypertext transfer protocol secure) is an example of a suitable secure server protocol. The web server generates a session facade 115, such as a graphical user interface (GUI) that is viewable by the user using the web browser 105. The GUI incorporates control elements, such as icons, pull-down menus and a cursor, to receive, display, and transmit information to and from the enterprise platform 100. The structure of the GUI can include one or more web pages. Each web page may be formatted using an Internet specification such as XML (extensible markup language) or HTML (hypertext markup language).

The GUI provided by the web server 110 provides access to applications that enable the user to interact with information controlled by the enterprise platform. For instance, a web page may call a client program, such as a "Java applet," from the user's computer (the "client computer"). Additionally, the web server 110 may run server programs, such as "Java servlets," that are accessible to the user through the web page.

The business layer of the enterprise platform 100 contains the business logic that defines transactions, services, and operations performed by the host processor. The business layer also drives a utility that enables a platform administrator to define the various user roles, through which access to different functionality is controlled by the enterprise platform 100.

The transactions, services, and operations performed by the host processor have varying degrees of persistence. A user's interaction with the GUI may create a user-specific server component that is transient, or "non-persistent." For example, a non-persistent server component, such as a "session bean" 120 exchanges information with the user. A typical session bean 120 performs a task for the user, such as ordering an insurance proposal, calculating the premium due for a given death benefit, or transferring funds, but terminates when the user terminates the session. A persistent server component, such as an "entity bean," creates a business object that is stored in a memory element, such as a relational enterprise database 125. An entity bean physically maps to data stored in the back-end layer of the enterprise platform. Examples of entity beans include records in tables in the enterprise database 125 that represent a particular user, the product ordered by the user (e.g., a type of insurance policy), or the user's order (e.g., a custom proposal). Generally, non-persistent server components call persistent server components to achieve the desired function of the session bean. Both persistent and non-persistent server components can access elements of the back-end layer, including the enterprise database 125. A third type of server component, commonly referred to as a message bean 130, receives and routes messages between session beans and entity beans, via a messaging transport pathway such as a JMS (Java Messaging Service) message bus 135.

The back-end layer of the enterprise platform provides secured connectivity to at least one enterprise database 125. The enterprise database 125 can be any suitable relational database, such an Oracle9i™ Database.

The back-end layer may also provide secured connectivity to external or legacy systems. An aspect of certain embodiments of the invention is the ability to populate or repopulate an enterprise database 125 with data provided by external systems. For example, an external system such as a mainframe computer may interact with the enterprise platform 100, such as by periodically uploading files to a shared location on a computer network. In certain embodiments, a mainframe computer uploads four files to the shared location. The first file contains records corresponding to insurance policies, and is transmitted from an insurance affiliate on a monthly basis. All policy information in the first file is used to update an existing policy stored on the enterprise database 125. The second file contains records corresponding to insurance policy riders. The third file is uploaded on a daily basis (as needed) and contains records corresponding to transactions, such as premiums paid, or withdrawals. The fourth file is also uploaded daily (as needed), and includes the value of certain funds.

The enterprise platform 100 queries the four files each day. If the query is completed, then the information retrieved from the file is stored in the enterprise database 125, and the queried file is deleted or moved to an alternate location.

Batch Processes

Certain processes performed by the enterprise platform will occur automatically (at least in part), preferably as batch processes. For example, the enterprise platform will generate periodic accounting memoranda to provide parties or their representatives (e.g., accountants or bookkeepers) with financial information. Financial information in accounting memoranda may include salary and bonuses paid to an employee, employee contributions to premiums, net economic benefit to the employee, employer equity in the CSV of the policy, and premiums payable. Accounting memoranda are preferably generated on the same day of each month, and may provide information at least one month in advance or retrospectively for the preceding month. At least some of the financial information is calculated according to algorithms supplied by business rules. With respect to a particular entity or policy, the financial information included in previous accounting memoranda may be retained as accounting history, and may be at least partially omitted from a future accounting memorandum.

Accounting memoranda may also contain non-calculated information such as static text, boilerplate text, and entity-specific text. Some static text includes specific language or information that must be printed according to governmental regulations, which may vary according to the state in which the policy was initiated. Other static text may include the name and address of the entity receiving the accounting memorandum. In the process of generating an accounting memorandum, the enterprise platform retrieves the appropriate static text from an enterprise database. Boilerplate text may includes text and images common to all accounting memoranda, such as generic headers, footers and other formatting. Boilerplate text is established by defining the layout of proposals using a proposal setup application run by the enterprise platform.

As another example of a batch process, a policy reevaluation is performed to determine whether an inforce policy is achieving the intended policy objectives. Policy objectives may include such parameters as a target cash value at a particular point in time, a target death benefit payable to a particular entity at a particular point in time; a maximum tax liability; or a maximum interest rate or amount imputed to an entity. The enterprise platform performs a batch of policy evaluations on a periodic basis, such as on a predefined day of each week, month, or quarter. Each batch may include a policy evaluation for each inforce insurance policy having a particular characteristic, such as a plan anniversary during that period or an association with a certain entity.

A policy reevaluation involves making a judgment as to whether each of one or more policy objectives is being achieved with the current policy configuration. Each judgment is made by comparing at least one actual policy parameter to a predefined or indexed target value. For example, the current cash surrender value (CSV) of a policy can be compared to a predetermined target CSV or to an index that provides an average CSV for a comparable policies. If the actual policy parameter deviates significantly from the target value, the policy is flagged as failing to achieve objectives, or "non-conforming." The significance of the deviation is preferably determined by implementing a predefined tolerance range or percentage through business rules.

Identifying a policy as non-conforming may trigger a re-proposal of the non-conforming policy. As insurance policies are typically negotiated as a group, a proposal application may generate a re-proposal for each member of a group in which a predetermined number or percentage of policies are non-conforming. Alternatively, the results of policy reevaluations can be considered on a group basis to determine whether the group as a whole is non-conforming, and whether re-proposals should be generated for each member of the group.

Proposal Data Input—Split-Dollar Policy

The proposed IRS regulations on split-dollar arrangements generally prescribe a particular taxation regime depending upon the identity of the owner of the policy. If the sponsor is the policy owner (deemed or actual), the insurance policy is an "endorsement" split-dollar policy. For a sponsored policy, any transfer of the cash surrender value (CSV) to the insured is fully taxable at the time of the transfer. If the insured is the policy owner (deemed or actual), then the insurance policy is a "loan regime" split-dollar policy. Any premiums paid by the sponsor are treated as a loan from the sponsor to the insured. Interest on the loan may imputed under applicable below market interest provisions of the Internal Revenue Code In certain embodiments, the sponsor is an employer, and the insured is an employee of the sponsor. To generate a proposal for a split-dollar policy, certain proposal input data is provided to the enterprise platform. To facilitate entry of this information, the GUI includes several proposal input screens.

Figure 2:
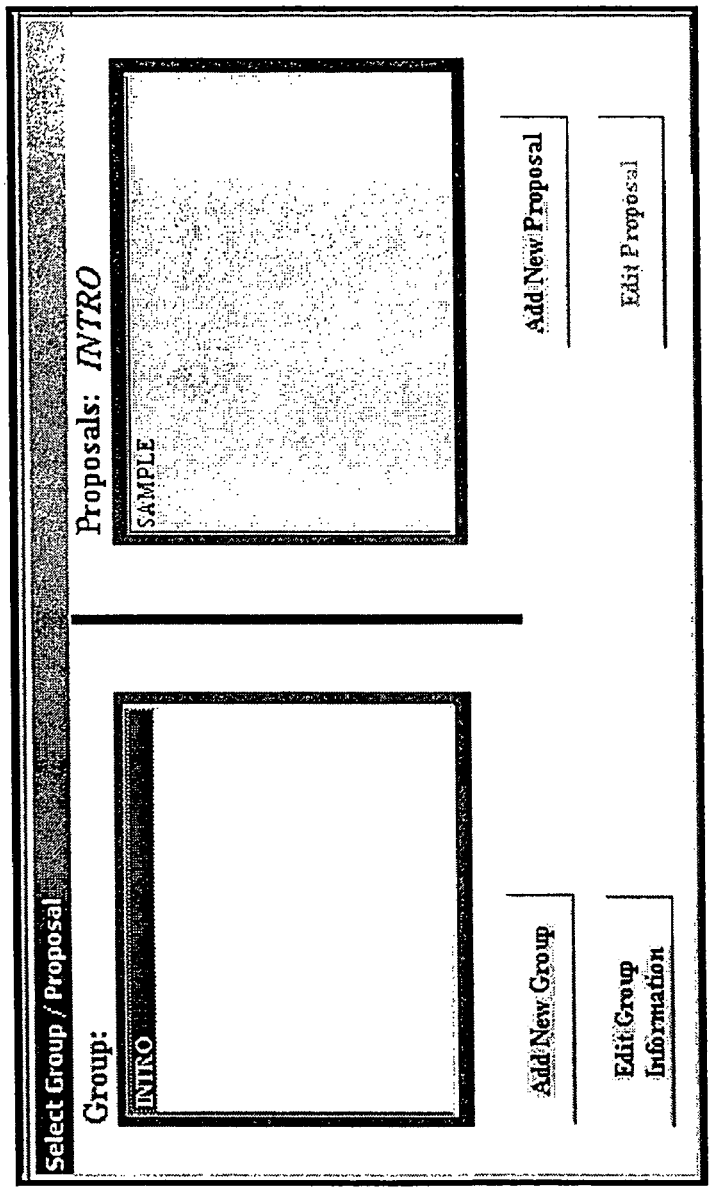

FIG. 2 is a representation of a proposal input interface, which is referred to as the proposal initiation screen 200. Using this screen, a user can create a new group, and then associate proposals with the group.

Figure 3:

FIG. 3 is a representation of another proposal input interface, which is referred to as the proposal data screen 300. The proposal data screen 300 includes fields that contain basic information about the parties to a new proposal, such as:

"Proposal Name"—a text field that contains an assigned name for the report, or other text descriptor;

"Insured Name"—a text field that contains the name of the person to be insured under the proposed insurance policy;

"Insured Date of Birth;"

"Insurance Age"—a calculated field, the content of which is based upon the data entered in the "Insured Date of Birth" field;

"Sex"—a dropdown or radio button control that requires the selection of the gender of the insured;

"Co-Owner"—the person or entity designated as the co-owner of the policy, such as a trust;

"Employee Name"—the name of the person employed by the sponsor, if the employee is someone other than the insured; and "Income Tax Rate"—the tax bracket assigned by the IRS, which is used to calculate the CSV and tax implications attributed to the employee.

The proposal data screen 300 may also include fields for collecting demographic data that describes a second insured person. The Co-owner field 330 and the Employee Name field 335 preferably automatically store the Insured Name as a default value, but can be changed using a Change control 345.

Figure 4:
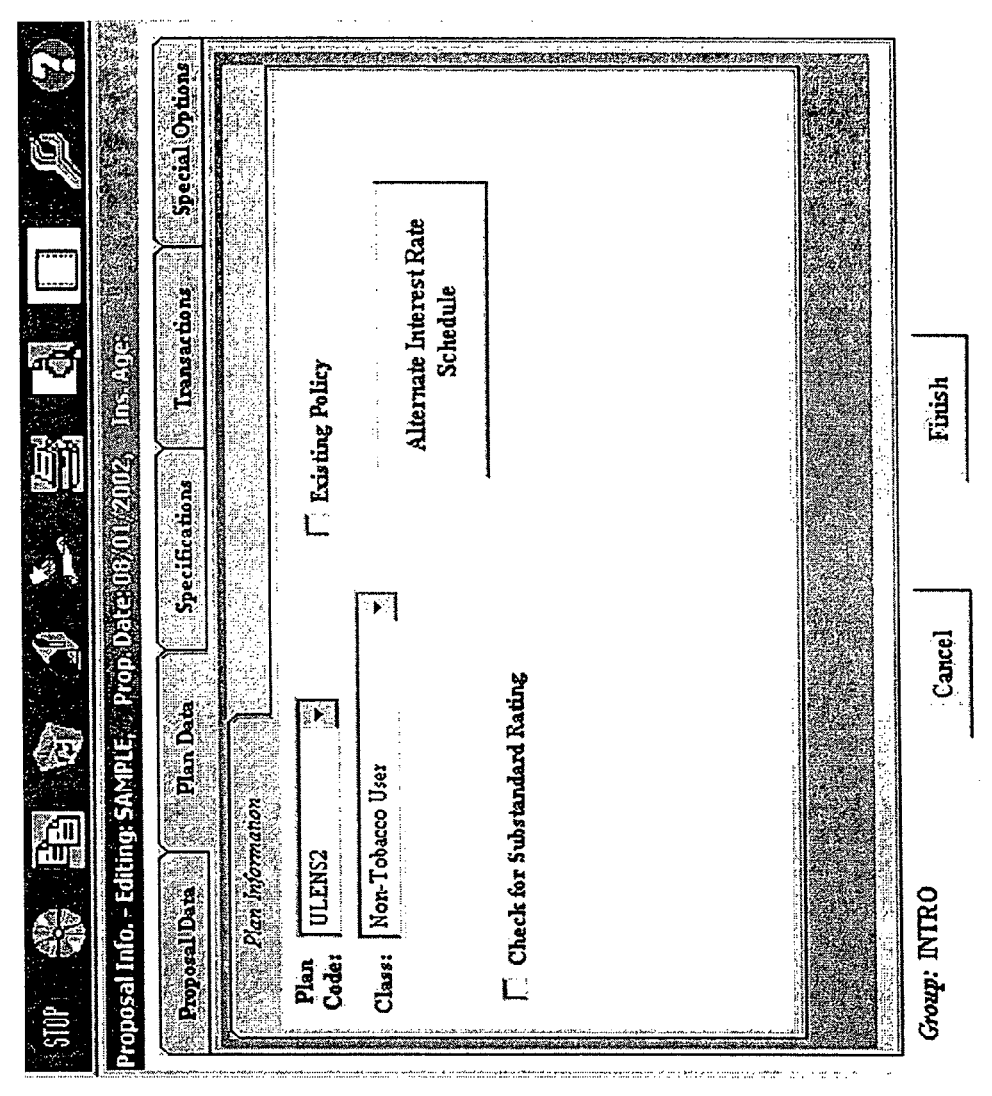

FIG. 4 represents yet another proposal input interface, referred to as the plan data screen 400. The plan data screen 400 includes fields that contain basic information about the type of proposal to be generated. The user indicates whether the proposal is to be generated for an existing policy (and thus, is a re-proposal), by checking or clearing the box in the "Existing Policy" 405. Then, the user selects from an available "Plan Code" list 410. The codes that are available in the Plan Code list 410 vary according to the status of the "Existing Policy" field 405. If the proposal relates to an existing policy, the Plan Code list 410 will include all types of policies currently and formerly offered by the insurance provider. The full list of policy type codes is available in this instance to allow the user to convert an older policy to a new type of policy. However, if the proposal is being generated in relation to a new policy, only those policies that are currently offered by the insurance policy.

If the box in the Existing Policy field 405 is checked, the user may be prompted to enter certain information about the existing policy, including:

identity of the policy owner;
employer equity share;
accumulated policy value (also referred to as the cash surrender value, or "CSV");
proposed conversion date;
cumulative premium paid to conversion date;
current face value of the policy;
premium payment frequency (e.g., monthly, quarterly, semi-annual, annual);
policy initiation date;
current premium amount; and
a description of the policy conversion.

The plan data screen may also be used to communicate any other overarching parameters that will impact the structure or cost of the insurance policy, such as by identifying an insured that has a substandard credit insurability rating (field 415), entering an applicable "Alternative Interest Rate Schedule" (control 420) imputed to the insure, or designating an actuarially significant "Class" to which the insured belongs, such as "non-tobacco user" (field 425). If the insured has a substandard credit or insurability rating, the plan data screen may prompt the user to input the number of years the rating applies, and/or a dollar amount that must be applied to mitigate or offset the substandard rating.

Figure 5:
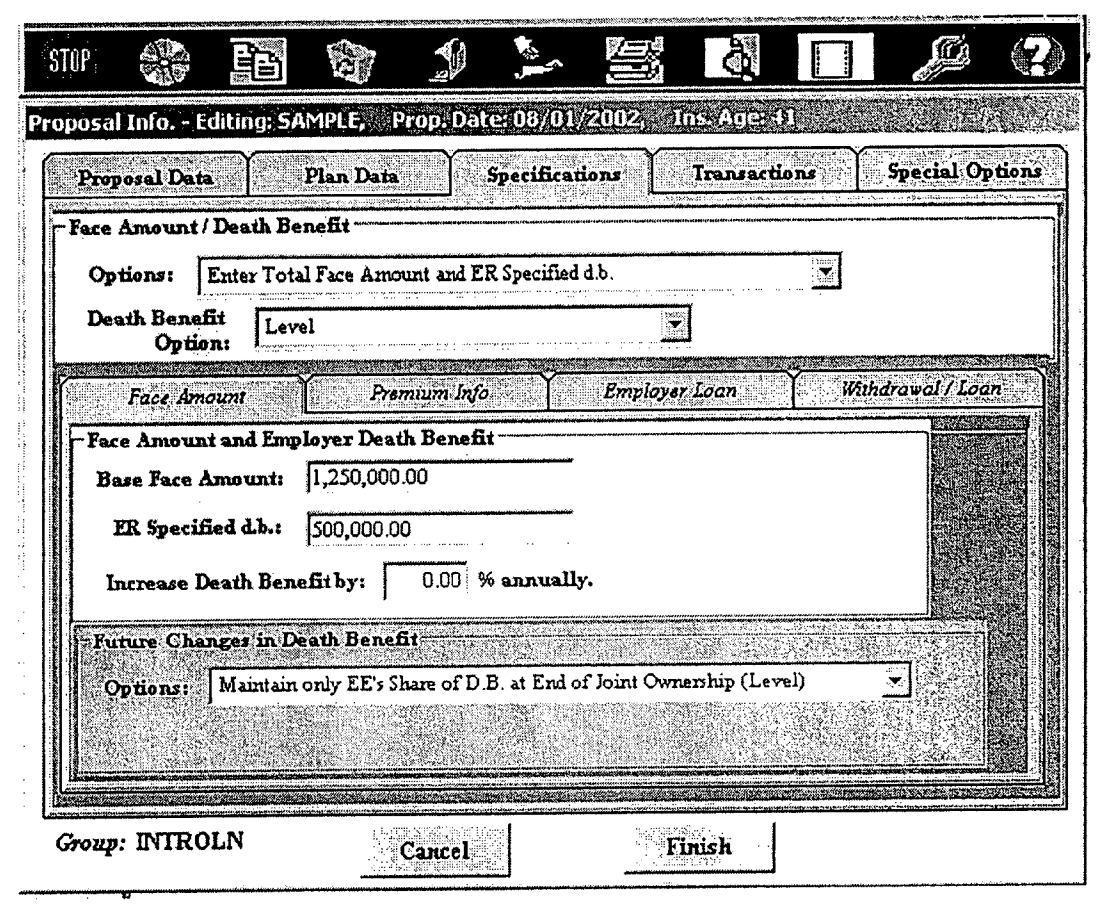

FIG. 5 represents a proposal input interface referred to as the specifications screen 500. The specifications screen 500 allows the user to tailor the proposal to meet the specific objectives of the parties to the insurance contract. The "Face Amount/Death Benefit Options" field 505 prompts the user to select which policy parameters the user wants to control to achieve the specified policy objectives. Thus, the user's selection in field 505 designates an algorithm to be used as the engine for structuring the insurance policy. For instance, if a policy objective is to provide a particular death benefit to an employee, the user may choose the option that requires the user to specify the desired employee death benefit and the maximum face value of the policy; these specifications are used to "solve for" applicable premiums or other policy parameters. Alternatively, the user can choose the option that requires the user to enter only the desired employee death benefit. Similarly, the user may choose the option that requires the user to specify a desired premium level, a desired employer death benefit, or a desired withdrawal or loan schedule. At least some of the remaining parameters are calculated based upon the specifications of the user. The user may further customize the parameters by selecting a "Death Benefit Option" 510, which determines whether the death benefit remains level throughout the term of the policy, or increases either by a specified percentage or by absorbing at least the accumulated value of the policy.

The fields included in the "Face Amount" screen 515 correspond to the value of the Face Amount/Death Benefit Options field 505. For example, if the user chooses in field 505 to enter the face amount and the death benefit payable to the employer, then the fields and text shown in the Face Amount screen 515 prompt the user for that information. The Face Amount screen 515, which may be a child or sub-screen of the Specifications screen 500, includes a "Base Face Amount" field 520 and a "Employer Death Benefit" field 525. The user may indicate that the employer death benefit is to increase by a predefined annual percentage using field 530.

The user may also request future changes to the policy death benefit that indicate how the death benefit should be altered at the end of the sponsorship relationship, using field 535. The employee's share of the death benefit may be maintained, increased, or decreased at the end of the arrangement.

Figure 6:
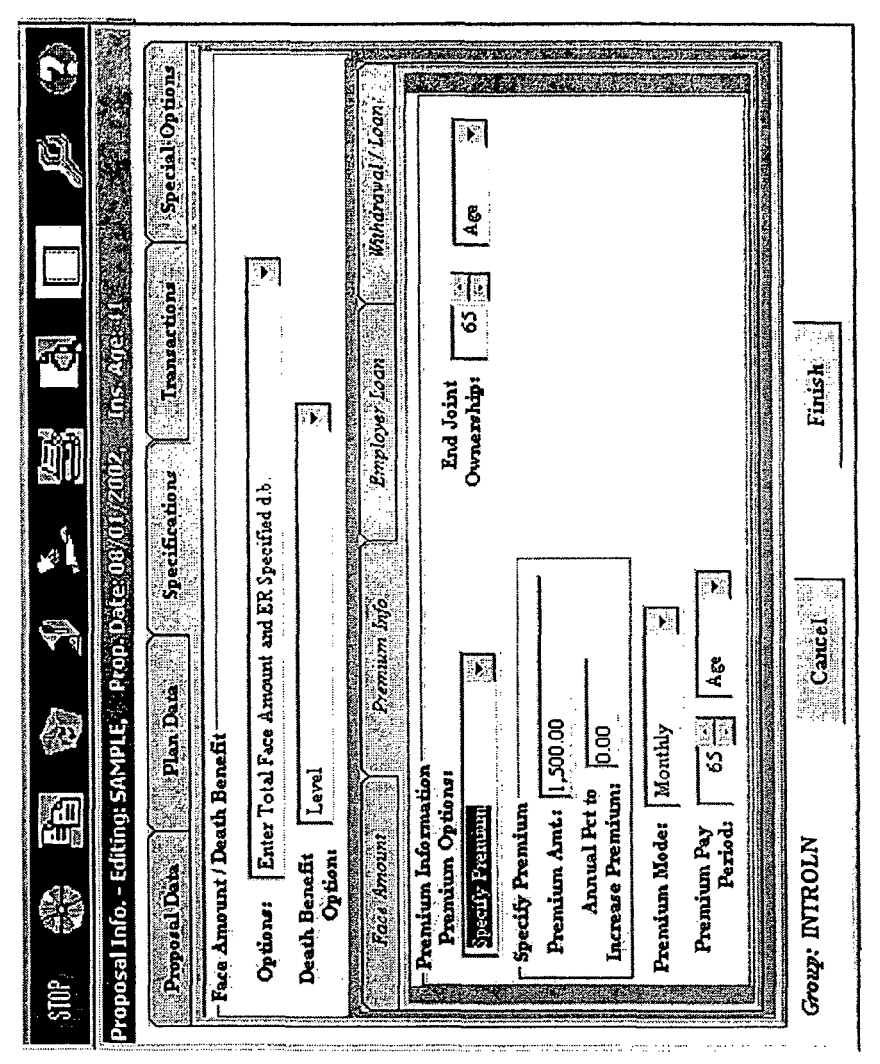

In addition to providing specifications related to the death benefit and cash value of the policy, the user can also specify premium objectives, employee reimbursement and bonus objectives, and withdrawal or loan objectives. Premium objectives are specified using the premium input screen 600 shown in FIG. 6. The "Premium Options" field 605 is preferably a list box that includes options that are available to the user depending upon the user's selection in the "Face Amount/Death Benefit Options" field 505 of the specifications interface 500. Potential values for the Premium Options field 605 include:

specify premium;

specify cash value objective; and specify maximum premium according to regulatory guidelines (such as the DEFRA guideline premium and cash value accumulation tests).

If the user elects to specify the premium, the premiums payable for the term of the policy are determined by the user's entries in a "Premium Amount" field 610 and an "Annual Percent Increase" field 615. The user indicates in the "Premium Mode" field 620 the frequency of premium payments. The "Premium Pay Period" fields 625 indicate the policy year or the insured age at which premiums are no longer due. Similarly, the "End Arrangement" field specifies the policy year or the insured age at which the split-dollar or joint ownership arrangement ends.

Figure 7:
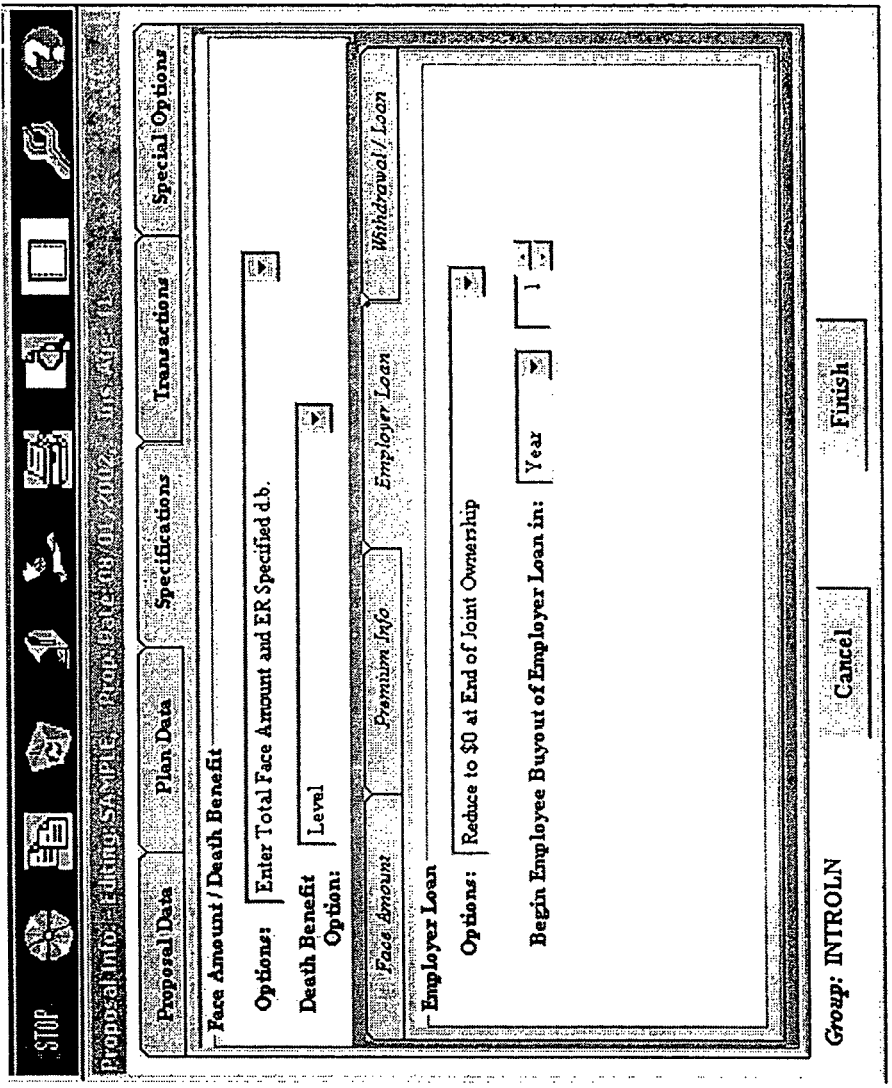
Figure 9:
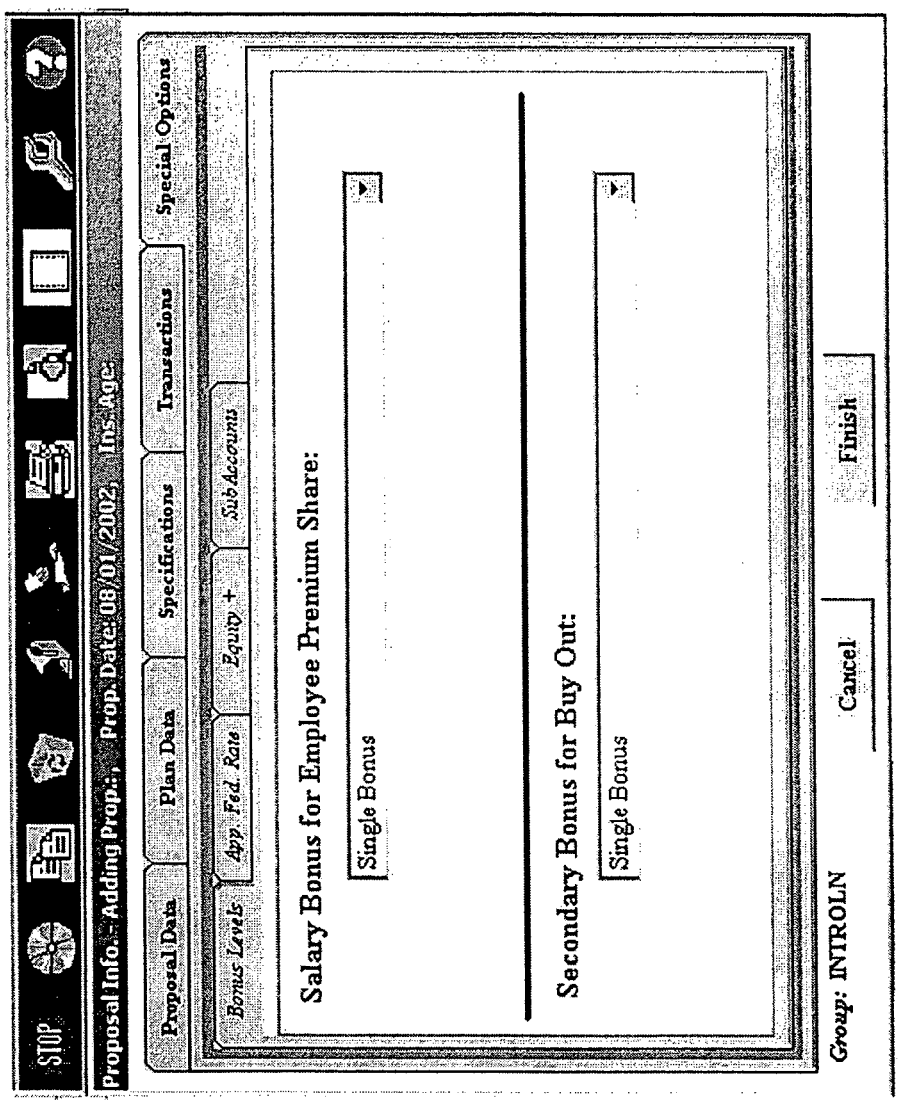

In a split-dollar arrangement, the employer's "loan" to the employee (in the form of premiums paid) is typically repaid by the employee over at least part of the term of the policy. Using the "Employer Loan" screen 700 shown in FIG. 7, the user can control how the "loan" is repaid. In the "Employer Loan Options" field 705, the user may choose to repay all or part of the employer loan. The user can specify a future year for the employee to begin repaying the loan, using field 710.

Figure 8:
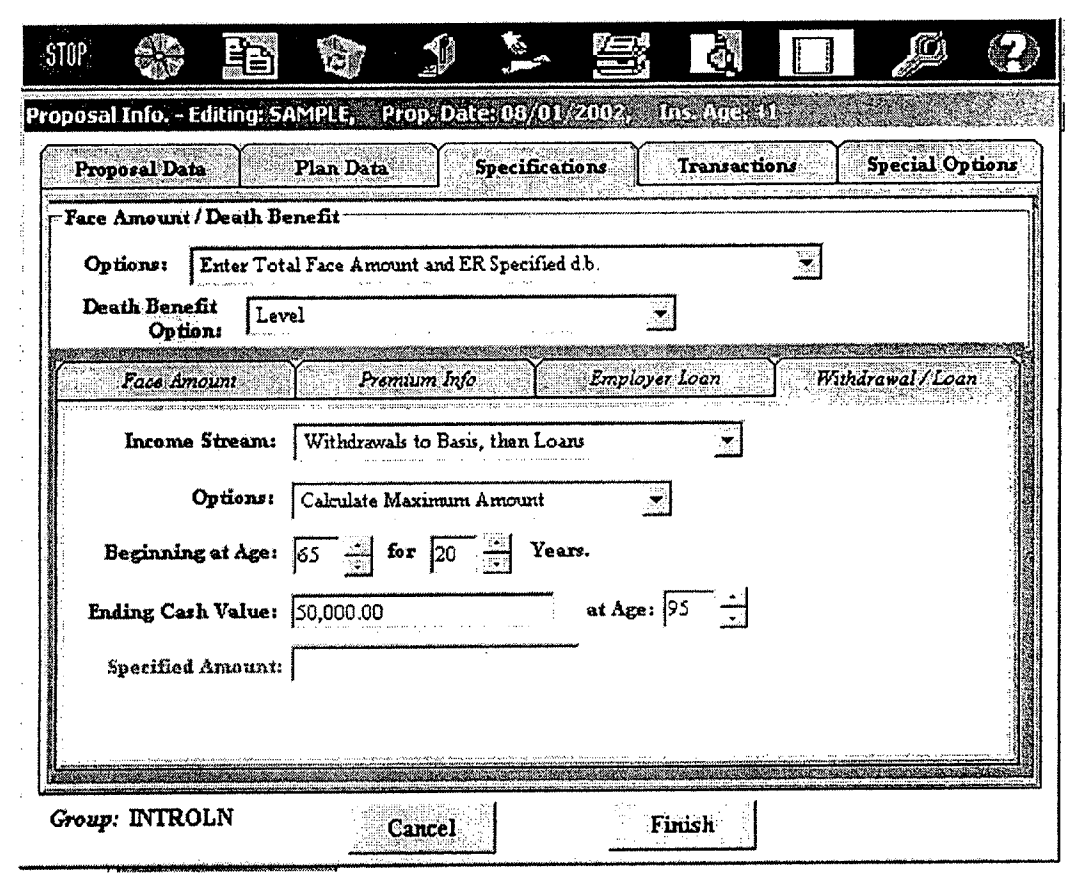

A split-dollar policy can be structured to achieve an objective of providing an income stream to the employee. To do so, the employee may receive funds from the insurance policy in at least three ways. First, the employee can withdraw amounts up to the premiums paid by the employee without tax consequences. Second, the employee may borrow against growth realized by the policy with some tax consequences. Third, the employee may directly withdraw funds from the CSV of the policy. Funds directly withdrawn may be fully taxable to the employee under applicable provisions of the Internal Revenue Code. FIG. 8 represents a proposal input interface referred to as the "Withdrawal/Loan" screen 800. The user can select from withdrawal or loan options using the "Income Stream" field 805. Using the "Income Stream Options" field 805, the user can choose to specify the amount of the withdrawal, or to have the amount of the withdrawal calculated so as to minimize tax consequences and to prevent inadvertent policy lapse (a policy generally lapses when the sponsor's owned cash value becomes zero). According to the selection in field 805, the appropriate fields 810, 815, 820, 825, 830, and 835 are enabled.

To reimburse the employee for premiums and loan repayments paid by the employee, the employer can pay the employee additional salary in the form of bonuses. Using the "Bonus Levels" screen 905 accessed from a "Special Options" screen 900, the user may choose to pay the employee no bonus, a single bonus, a single bonus with an employee withdrawal, or a double bonus. A single bonus reimburses only the employee's actual loan or premium payments; the employee is solely responsible for the tax implications of the bonus. A single bonus with an employee withdrawal includes a withdrawal of funds from the policy, where the withdrawal is sufficient to cover the tax consequences of the bonus. A double bonus is sufficient to reimburse the employee and to pay the tax assessed on the bonus. The user uses the "Salary Bonus for Employee Premium Share" field 910 and the "Secondary Bonus for Buy Out" to indicate which of the bonus options is applicable to reimbursements for employee premium and loan payments, respectively.

The applicable federal rate (AFR) is input using the interface referred to as the "Applicable Federal Rate" screen 1000. An interest rate is entered in field 1005, and the policy year in which the interest rate in field 1005 takes effect is entered in field 1010. The interest rate in field 1005 remains in effect for the duration of the policy, unless a second interest rate is entered in field 1015. The second interest rate will take effect in the policy year entered in field 1020, and will remain in effect for the duration of the policy unless a third interest rate is entered in field 1025, and so on. During administration, the appropriate interest rates are substituted for the rate(s) used in the illustrations/projections.

Figure 11:
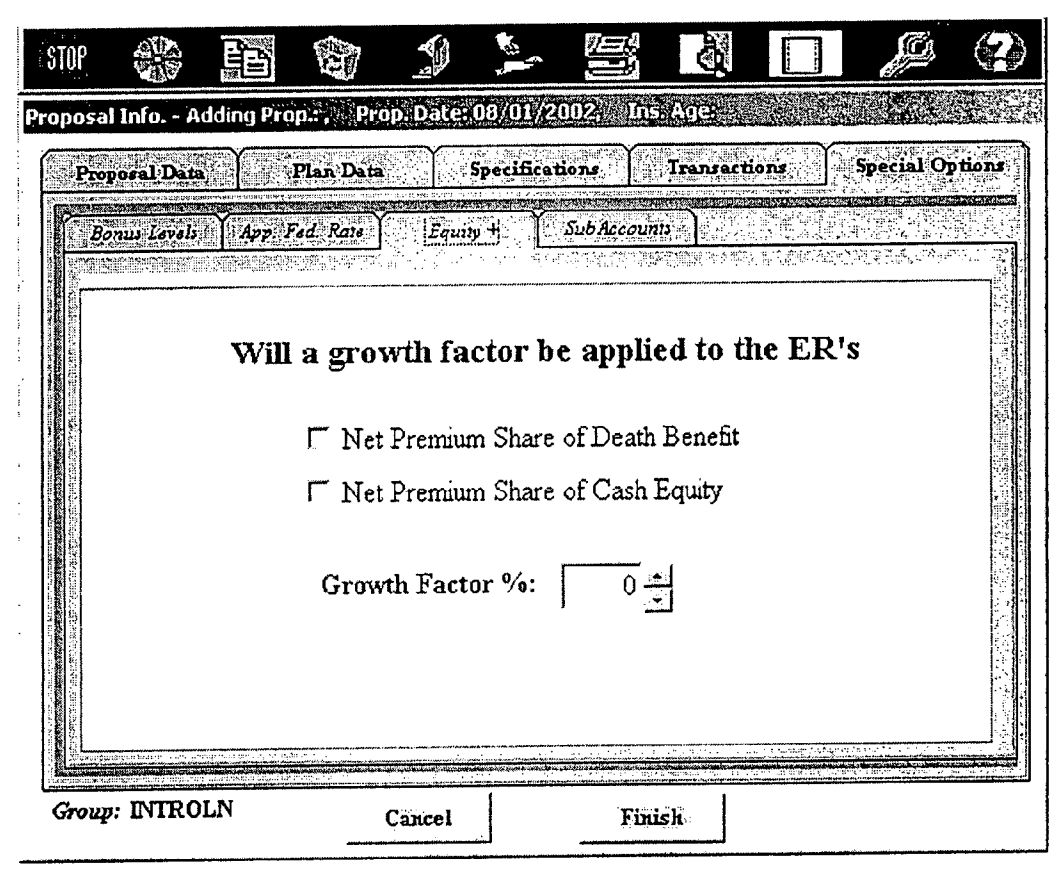

An annual growth factor can be applied to the employer's share of the premiums, using the "Equity" screen 1100 shown in FIG. 11.

Proposal Data Input—Joint Owned Policy

Where two or more parties jointly own a life insurance policy, the parties are considered to own two separate policies, provided each party owns an undivided interest in every right and benefit of the jointly-owned policy. Thus, a joint ownership arrangement is not a split-dollar arrangement under the proposed IRS regulations.

Throughout the term of the jointly-owned policy, the employer and employee each own an undivided interest in the policy. However, to achieve the objectives of the joint ownership arrangement, the relative equity shares of the employer and the employee may vary. For instance, the joint ownership arrangement may be designed to provide deferred compensation for the employee, while placing the majority of upfront costs on the employer, and mitigating the tax consequences to both parties. Thus, at inception, the joint ownership arrangement may be structured such that the employer's equity in the undivided interest is greater than that of the employee. Over a predetermined period of time, the employer gradually transfers its equity in the undivided interest in the policy to the employee. The timing of the transfer may be optimized such that the employer's entire interest is owned by the employee at the most opportune time from an employment and tax viewpoint.

As an example, assume that at the inception of the joint ownership arrangement, the employer owns a 70% undivided interest, and the employee owns a 30% undivided interest. The employee intends to retire 10 years after inception of the jointly-owned life insurance policy. Thus, the employer may transfer the 70% undivided interest to the employee over the 10 year period by transferring 7% each year as an employee bonus.

Figure 12:
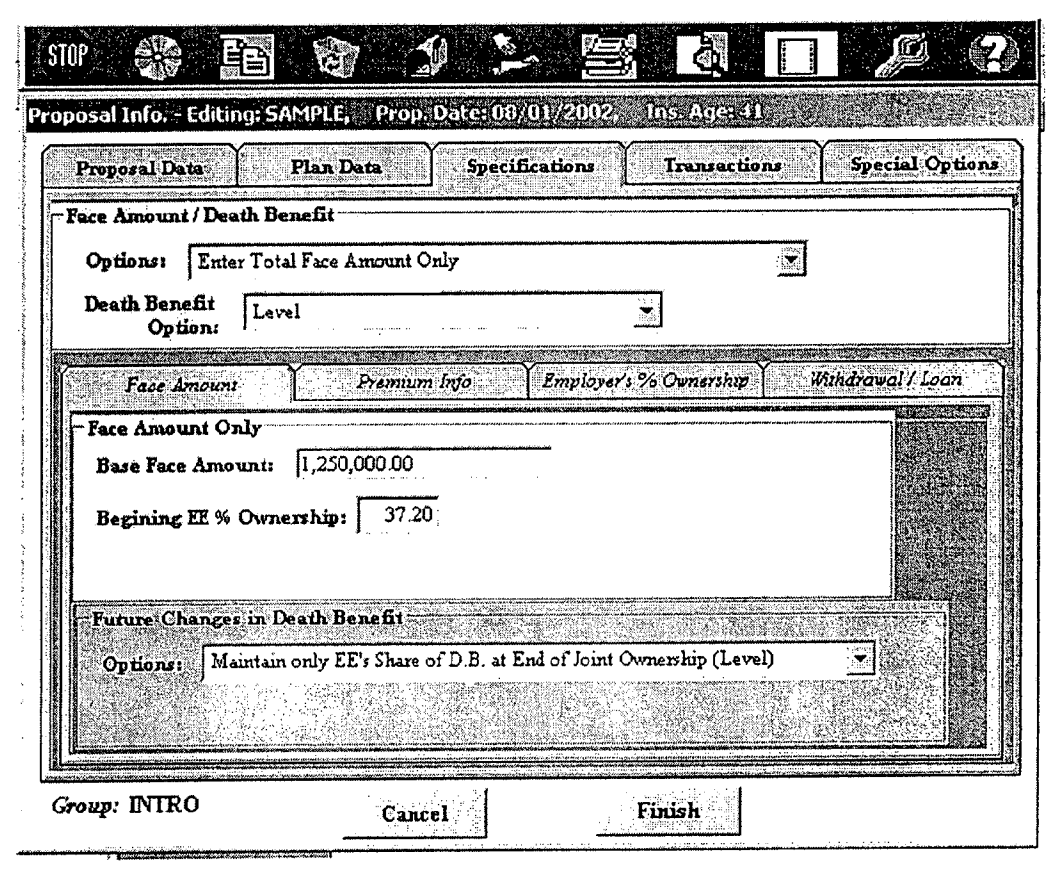

To generate a proposal for a jointly-owned policy, the user may use a proposal data interface and plan data interface that is very similar to those described above and in FIGS. 2-4. However, the selection in field 410 of a plan code that corresponds to a jointly-owned policy changes the functionality of the specifications interface 1200, as shown in FIG. 12. For a jointly-owned policy, the specifications interface 1200 focuses on achieving the equity objectives of the joint ownership arrangement. Specifically, the specifications interface 1200 prompts the user to specify the desired initial positions of the joint owners of the policy. The initial equity share of the owners is specified using the "Beginning Employee % Ownership" field 1205.

Figure 13:
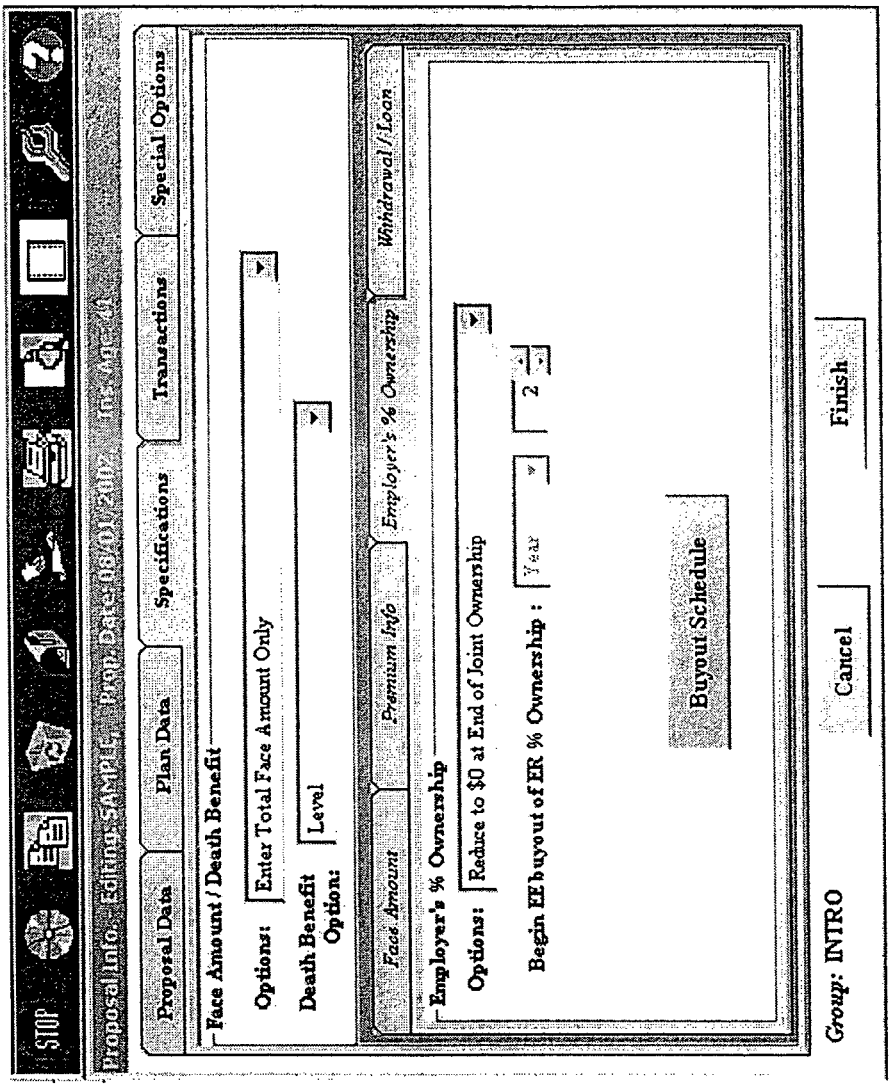

The beginning employee ownership may be increased to a given level, potentially 100%, over a predefined period of time. It follows that the beginning employer ownership is decreased to a corresponding terminal equity share, potentially 0%, over the same period of time. Referring to FIG. 13, an "Employer % Ownership" screen 1300 includes an "Employer % Ownership Options" field 1305, which allows the user to specify how the employer equity is decreased (or maintained) throughout the term of the policy. Field 1310 allows the user to specify the beginning of the equity transfer period during which the employer equity transfers equity in the insurance policy to the employee.

Proposal Data Input—Employer-Owned Policy

Figure 14:
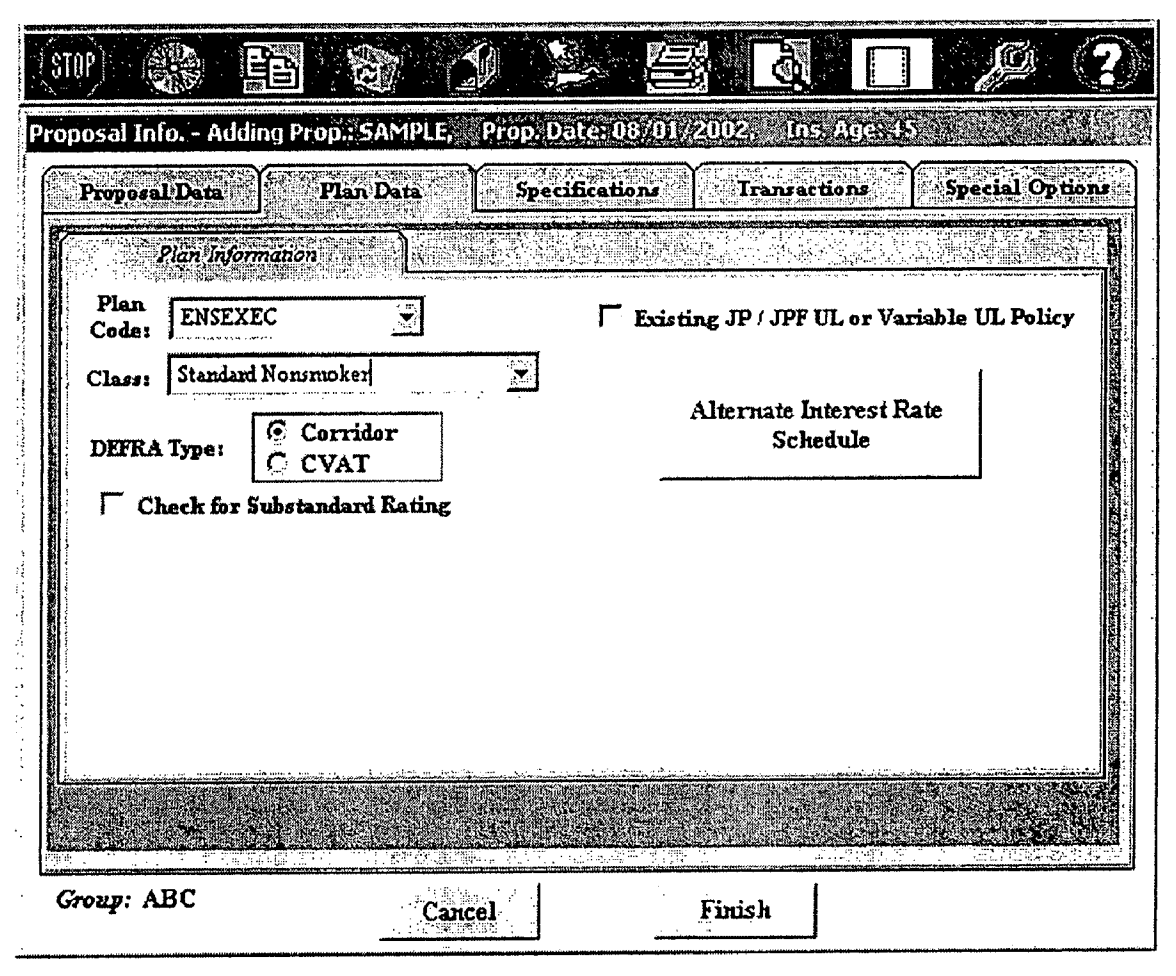
Figure 15:
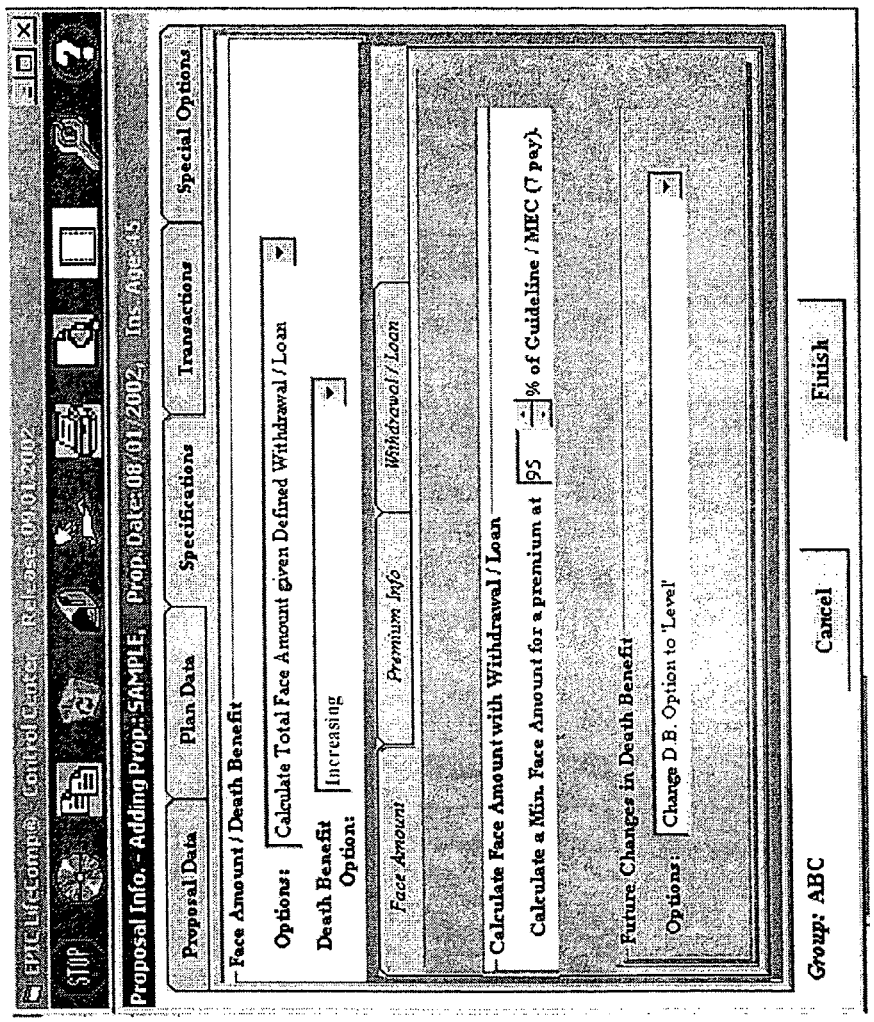
Figure 16:
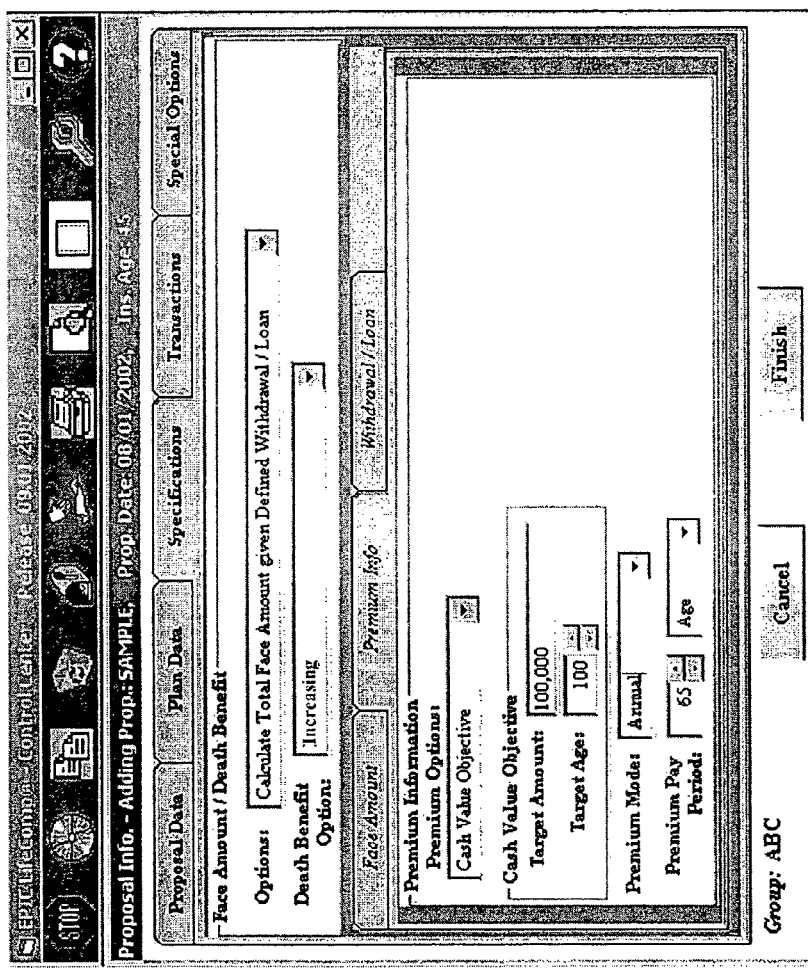

In general, input parameters for generating an employer owned policy are directed to reducing the tax consequences to the employee and to ensuring compliance with regulatory guidelines. FIG. 14 is a representation of an example of a proposal input interface for an employer owned policy. Control 1405 allows the user to comply with regulatory requirements that control the determination the minimum and maximum premiums that can be paid by employer for an employee's death benefit. In the embodiment shown, the determination is governed by DEFRA (The Deficit Reduction Act of 1984), which requires an insurance provider to follow either specific premium guidelines, or to use the cash value accumulation test (CVAT) to calculate permissible premiums. FIG. 15 represents the specifications screen 1500 for an employer owned policy, which allows the user to use control 1505 to establish a desired margin while complying with guidelines that regulate the maximum and minimum face value of the employer owned policy. FIG. 16 represents an example of a premium data screen 1600 for an employer owned policy. Controls 1605 and 1610 allow the user to input a target cash value of the policy at a particular employee age.

Proposal Generation

Proposal or re-proposal applications are invoked by the input data provided by the user in FIGS. 2-13. The proposal application produces at least some of the following outputs available to the user as an exposed service:

CSV equity of each entity (i.e., sponsor, insured, employer, or employee);
death benefit payable to each entity;
premium share imputed to each entity;
buy-out schedule between entity;
partnership ownership interest;
cost basis of each entity;
salary bonuses payable as reimbursement for a entity's premium share;
salary bonuses payable as reimbursement for buy-out of a entity's equity interest;
salary bonuses payable as reimbursement for a entity's imputed interest; and
estimated tax consequences and other liability for each entity.

Proposal data can be formatted as any of a number of printed or onscreen reports, and sent to an output device, such as a printer, or a computer display. The proposal data is also stored as a record in the enterprise database 125. A stored proposal can be retrieved and amended to create a re-proposal. A stored proposal can also be converted to an insurance policy, particularly after the proposal has been accepted by a potential party to the insurance policy.

FIGS. 17-36 are various reports delivered by the presentation functionality according to certain aspects and embodiments of the invention.

Policy Type Conversion

An existing insurance policy may need to be restructured for many reasons, including changes in the objectives of the parties to the policy, regulatory requirements, tax consequences, or changes in policy types supported by the insurance provider. Policy type conversion can be triggered by a policy reevaluation and/or re-proposal, or can be initiated by a user.

Certain embodiments of the present invention convert a policy from the policy's current policy type to a preferred policy type by first requesting input data that is required to create a policy of the preferred type. The information is requested by retrieving data from the enterprise data, and/or by prompting a user to provide additional input data. For example, if an existing split-dollar policy is to be converted to a jointly-owned policy, at least a beginning equity share for one of the parties is needed as an input parameter. The user can supply a desired beginning equity share. Preferably, the beginning equity share parameter is determined by taking a "snapshot" of the policy to be converted. The snapshot includes a determination of the current status of an inforce policy, which for a given point in time, includes at least the following parameters: identity of the owner prior to conversion; equity share of the parties to the policy; accumulated policy value; cumulative premium paid as of the date of conversion; face value of the policy to be converted; frequency of premium payments; premium amount; and the date on which the inforce policy was initiated. An equity transfer schedule can be determined using information associated with the split-dollar policy in the enterprise database, such as the age of the insured. When the required data is received, the enterprise platform completes the process of generating a proposal or creating a new policy of the preferred type, by applying the appropriate algorithms to the input data.

The foregoing description of various aspects of the invention has been presented only for the purpose of illustration and description and is not intended to be exhaustive or to limit the invention to the precise forms disclosed. Many modifications and variations are possible in light of the above teaching. For example, it should be understood that although various aspects, features and advantages of the embodiments of present invention are particularly applicable to life insurance, systems and processes of the various embodiments can be implemented for providers of other insurance services. Further, the invention is directed to systems and methods that can be implemented in any appropriate environments, independent of the operating systems, networking media, programming languages, and communications protocols implemented. Any of the various systems and processes of the invention can be implemented using any appropriate systems and methods for delivering, receiving and manipulating information, including but not limited to computers, personal digital assistants (PDAs), and wireless devices.

Additions, deletions, substitutions, and/or modifications can be made to the systems and processes disclosed herein and the elements or embodiments thereof without departing from the spirit and scope of various principles, features, aspects, and advantages of the present invention.

What is claimed is:

1. A computer-implemented process for proposing terms for a life insurance policy to be issued on the life of an insured and for monitoring the policy throughout its term, comprising the steps of:

inputting into a storage element in a computer system information relating to a prospective insured and a prospective co-owner of a single life insurance policy, said information including the insured's tax rate, a death benefit, an initial equity share owned by the insured, a terminal equity share owned by the insured, an equity transfer schedule, and an equity transfer period, wherein the insured and co-owner are, respectively, one of an employee and employer, a shareholder and corporation, and a donor and donee, and wherein the insured and the co-owner each own undivided interests in the life insurance policy;

calculating terms of the single life insurance policy, including an amount of premiums to be paid during the equity transfer period;

storing quantifiable policy objectives to be achieved by the life insurance policy in the storage element;

storing a predefined indexed or target value for one or more of the quantifiable policy objectives, and storing an acceptable deviation from the target value in the storage element;

monitoring, using the computer system, performance of the policy relative to the quantifiable policy objectives by comparing at least one of the objectives to the predefined or indexed target value and automatically setting a flag in the storage element to identify a policy as non-conforming if an objective varies by more than the acceptable deviation from the target value; and recalculating and reproposing terms of a non-conforming policy.

2. A data processing system for administering a life insurance policy to be issued on the life of an insured and which includes at least a processor and a storage element, comprising:

a user interface for receiving information for storage in the storage element relating to a prospective insured and a prospective co-owner of a single life insurance policy, said information including the insured's tax rate, a death benefit, an initial equity share owned by the insured, a terminal equity share owned by the insured, an equity transfer schedule, and an equity transfer period, wherein the insured and co-owner are, respectively, one of an employee and employer, a shareholder and corporation, and a donor and donee, and wherein the insured and the co-owner each own undivided interests in the life insurance policy;

a computer processor programmed to calculate terms of the single life insurance policy, including an amount of premiums to be paid during the equity transfer period;

program means for storing in the storage element: 1) quantifiable policy objectives to be achieved by the life insurance policy;

2) a predefined indexed or target value for one or more of the quantifiable policy objectives; and 3) an acceptable deviation from the indexed or target value;

automated means for monitoring performance of the policy relative to the quantifiable policy objectives by comparing at least one of the objectives to the predefined or indexed target value, and automatically setting a flag in the storage element to identify a policy as non-conforming if an objective varies by more than the acceptable deviation; and means for re-calculating and re-proposing terms of a non-conforming policy.

3. The data processing system of claim 2, further comprising a database for storing said information relating to a prospective insured and a prospective co-owner of the life insurance policy.

4. The data processing system of claim 2, further comprising means for periodically evaluating the life insurance policy and for determining a current equity share owned by the insured.

5. The data processing system of claim 4, further comprising means for recalculating the amount of premiums to be paid during the equity transfer period if the current equity share owned by the insured differs from a predetermined target equity share.

6. The computer-implemented process of claim 1, further comprising the additional step of, using the computer system, producing a co-owner's benefit analysis, including a schedule of premiums due from the co-owner, the co-owner's equity interest in the policy during the transfer period, and the co-owner's net expense during the transfer period.

7. The computer-implemented process of claim 1, further comprising the additional step of, using the computer system, producing an insured's benefit analysis, including a schedule of tax consequences for the insured relating to the policy, a schedule of the insured's equity interest in the policy, and the insured's cost basis.

8. The data processing system of claim 2, further comprising means for producing a co-owners benefit analysis, including a schedule of premiums due from the co-owner, the co-owner's equity interest in the policy during the transfer period, and the co-owner's net expense during the transfer period.

9. The data processing system of claim 8, further comprising means for producing an insured's benefit analysis, including a schedule of tax consequences for the insured relating to the policy, a schedule of the insured's equity interest in the policy, and the insured's cost basis.

10. The data processing system of claim 9, further comprising a database for storing said benefit analyses.

* * * * *